US006848191B2

(12) United States Patent
Shiraishi et al.

(10) Patent No.: US 6,848,191 B2
(45) Date of Patent: Feb. 1, 2005

(54) APPARATUS AND METHOD FOR FORMING A COMBINED SUBSTRATE STRUCTURE

(75) Inventors: Hideaki Shiraishi, Tokyo (JP); Takeshi Sasaki, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 75 days.

(21) Appl. No.: 10/124,978

(22) Filed: Apr. 18, 2002

(65) Prior Publication Data

US 2003/0013318 A1 Jan. 16, 2003

(30) Foreign Application Priority Data

Apr. 27, 2001 (JP) ........................................ 2001-132551

(51) Int. Cl.[7] .......................................... H01L 21/469
(52) U.S. Cl. ............................ 33/568; 33/333; 33/549; 382/218; 382/125; 382/8; 445/24; 445/66; 438/758
(58) Field of Search .......................... 33/568, 573, 333, 33/549; 382/218–219, 209, 48, 125–126, 1, 8; 445/24, 66; 340/686.2, 686.5; 438/758

(56) References Cited

U.S. PATENT DOCUMENTS

| | | | | |
|---|---|---|---|---|
| 6,272,763 B1 | * | 8/2001 | Yamaguchi et al. | ........... 33/568 |
| 6,457,478 B1 | * | 10/2002 | Danese | ........................ 134/1.3 |
| 6,631,726 B1 | * | 10/2003 | Kinoshita et al. | ......... 134/102.1 |
| 2001/0035131 A1 | * | 11/2001 | Sakuma et al. | ............... 438/689 |
| 2002/0022379 A1 | * | 2/2002 | Ashizawa et al. | ........... 438/785 |
| 2002/0078580 A1 | * | 6/2002 | Haugen et al. | ................ 33/533 |
| 2002/0086259 A1 | * | 7/2002 | Shirakawa et al. | .......... 432/152 |
| 2002/0123236 A1 | * | 9/2002 | Tanaka et al. | ............... 438/758 |
| 2003/0171057 A1 | * | 9/2003 | Lee et al. | ....................... 445/24 |
| 2003/0173032 A1 | * | 9/2003 | Lee et al. | ..................... 156/382 |

FOREIGN PATENT DOCUMENTS

| | | | | |
|---|---|---|---|---|
| JP | 9-281513 | 10/1997 | ......... | G02F/1/1339 |
| JP | 10-104564 | 4/1998 | .............. | G02F/1/13 |
| JP | 11-2823 | 1/1999 | ......... | G02F/1/1339 |

* cited by examiner

Primary Examiner—G. Bradley Bennett
Assistant Examiner—Yaritza Guadalupe
(74) Attorney, Agent, or Firm—Hayes Soloway P.C.

(57) ABSTRACT

An apparatus for supporting a combined substrate structure, comprising first and second substrates combined, includes: level-adjustable supporting mechanisms for supporting plural supporting points of a bottom surface of the combined substrate structure; a level-detecting system for detecting respective levels of corresponding points of a top surface of the combined substrate structure to the plural supporting points of the bottom surface; and a control system for receiving the detected levels from the level-detecting system and for controlling the plurality of level-adjustable supporting mechanism in respective level-adjustment operations in accordance with the detected levels.

38 Claims, 25 Drawing Sheets

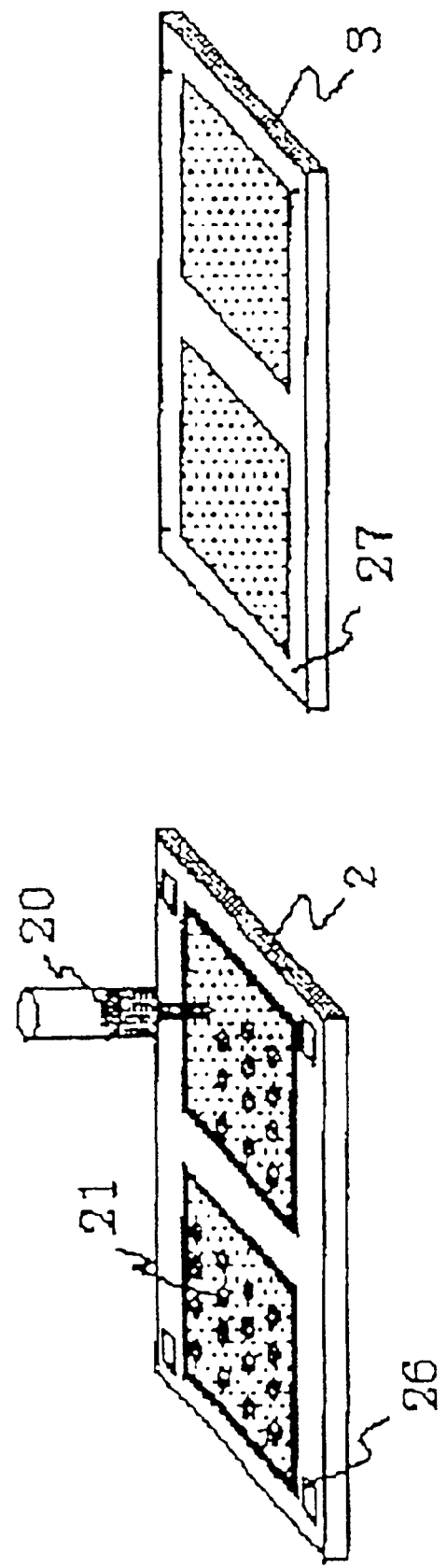

APPARATUS AND METHOD FOR FORMING A COMBINED SUBSTRATE STRUCTURE

BACKGROUND OF THE INVENTION

1. Field of the Invention

The present invention relates to an apparatus for forming a liquid crystal display, and more particularly to an apparatus for forming a combined substrate structure which comprises first and second substrates which are bonded to each other.

2. Description of the Related Art

The liquid crystal display includes two glass substrates and a liquid crystal filled into a gap between the glass substrates. The two glass substrates are, for example, a thin film transistor substrate and a color filter substrate. FIG. 1 is a schematic perspective view of a structure of a liquid crystal display. The liquid crystal display includes a thin film transistor substrate 2 and a color filter substrate 3.

The thin film transistor substrate 2 comprises a glass substrate having a dot-matrix array of plural pairs of a transparent electrode 35 and a thin film transistor 28. The thin film transistor 28 controls a voltage application to the paired transparent electrode 35 so as to control light-transmittivity of the liquid crystal. The color filter substrate 3 also has a dot-matrix array of color filters 36 of three primary colors, for example, red, green and blue. The color filters 36 make plural pairs with the transparent electrode 35.

The liquid crystal display also includes a back-light 30 for emitting a light and a first polarization filter 31 positioned between the back-light 30 and the thin film transistor substrate 2 for polarizing the emitted light as well as a second polarization filter 32 facing to the color filter substrate 3, so that the paired substrates 2 and 3 are interposed between the first and second polarization filters 31 and 32. The polarized light is transmitted through the thin film transistor substrate 2 and the transparent electrode 35. The polarized light is then incident into the liquid crystal between the thin film transistor substrate 2 and the color filter substrate 3.

Liquid crystal molecules 29 are ordered with a twist in a direction vertical to the surfaces of the thin film transistor substrate 2 and the color filter substrate 3. A twist angle of the liquid crystal molecules 29 depends on the applied electric field to the liquid crystal molecules 29. The electric field applied to the liquid crystal molecules 29 is proportional to the voltage applied between a pair of the transparent electrode 35 and the color filter 36. The color filter 36 is fixed at a reference potential of 0V. The control voltage is applied to the transparent electrode 35 under the control by the thin film transistor 28. Namely, the on-off switching operation of the thin film transistor 28 varies the potential of the transparent electrode 35, whereby the on-off switching operation of the thin film transistor 28 varies the voltage applied between a pair of the transparent electrode 35 and the color filter 36. Thus, the on-off switching operation of the thin film transistor 28 varies the twisted angle of the liquid crystal molecules 29.

The light is propagated along the twist of the liquid crystal molecules 29. An emitted light 33 from the back-light 30 is polarized by the first polarization filter 31. The polarized light is propagated through the liquid crystal along the twisted order of the liquid crystal molecules 29, wherein the polarization direction of the polarized light rotates in accordance with the twisted angle of the liquid crystal molecules 29. The polarized light is further transmitted through the color filter substrate 3 and the second polarization filter 32, whereby the liquid crystal display emits an output light 34. The second polarization filter 32 allows transmission of all of the light when the applied voltage to the transparent electrode 35 is 0V.

If a higher voltage is applied to the transparent electrode 35, then the ordered liquid crystal molecules 29 become oriented in the vertical direction to the surfaces of the color filter substrate 3, whereby the light is not twisted during the propagation through the liquid crystal, resulting in no transmission of the light through the second polarization filter 32.

As described above, the variation of the voltage applied to the transparent electrode 35 varies the intensity of the output light 34. Each dot is allocated with any one of the three primary colors. The lightness of each dot is controllable by controlling the voltage applied to the transparent electrode 35. Any images may be displayed by combination of dots, each of which has the pre-allocated hue and variable lightness.

The light transmittivity of the liquid crystal display is one of the important factors for the display quality. An interrelation between the light transmittivity and an accuracy of the alignment between the thin film transistor substrate 2 and the color filter substrate 3 will be described with reference to FIGS. 2A and 2B. FIG. 2A is a fragmentary cross sectional elevation view of light transmissions through the liquid crystal display, wherein the thin film transistor substrate and the color filter substrate are aligned at a high accuracy. FIG. 2B is a fragmentary cross sectional elevation view of light transmissions through the liquid crystal display, wherein the thin film transistor substrate and the color filter substrate are miss-aligned at a low accuracy.

With reference to FIG. 2A, the thin film transistor substrate 2 and the color filter substrate 3 are aligned at a high accuracy, whereby the respective-paired transparent electrode 35 and color filter 36 are also aligned at the high accuracy. All of the polarized light as transmitted through the transparent electrode 35 are also transmittable through an entirety of the color filter 36. An effective aperture diameter "d1" is maximum. The transmittivity of the light through the liquid crystal display is high.

With reference to FIG. 2B, the thin film transistor substrate 2 and the color filter substrate 3 are miss-aligned at a low accuracy, whereby the respective-paired transparent electrode 35 and color filter 36 are also miss-aligned at the low accuracy. Only a part of the polarized light as transmitted through the transparent electrode 35 is transmittable through a part of the color filter 36. The effective aperture diameter "d2" is lower than "d1". The transmittivity of the light through the liquid crystal display is low.

The light-transmittivity depends on the accuracy of the alignment between the thin film transistor substrate 2 and the color filter substrate 3. As the accuracy of the alignment between the thin film transistor substrate 2 and the color filter substrate 3 is high, then the light-transmittivity is high. As the accuracy of the alignment between the thin film transistor substrate 2 and the color filter substrate 3 is low, then the light-transmittivity is low.

If the accuracy of the alignment between the thin film transistor substrate 2 and the color filter substrate 3 is lower than what is shown in FIG. 2B, then a part of the light is leaked through an adjacent dot. This leakage of the light from the adjacent dot makes the display defect. In order to avoid this light leakage, the transparent electrode 35 and the color filter 36 are so designed as size-reductions by estimated errors in the alignment between the thin film transistor substrate 2 and the color filter substrate 3.

If the above issue of the low accuracy of the alignment between the thin film transistor substrate 2 and the color filter substrate 3 can be overcome, it is unnecessary that the transparent electrode 35 and the color filter 36 are so designed as size-reductions, whereby the effective aperture may be designed larger. The improvement in the accuracy of the alignment between the thin film transistor substrate 2 and the color filter substrate 3 and the design of the transparent electrode 35 and the color filter 36 without size-reductions results in a multiplier effect of great improvement in the display quality of the liquid crystal display.

As described above, the display quality of the liquid crystal display depends largely on the accuracy of the alignment between the thin film transistor substrate 2 and the color filter substrate 3.

The thin film transistor substrate 2 and the color filter substrate 3 are bonded by utilizing a thermosetting seal which is set upon a heat application. This process is so called as seal thermosetting.

FIG. 3 is a schematic view illustrative of the seal thermosetting apparatus for bonding the thin film transistor substrate and the color filter substrate. The seal thermosetting apparatus includes an entrance 11, a supporter 22, a heater 8, a heat-resistive HEPA filter 9 and a blower 10.

The combined substrate structure 1 comprising the thin film transistor substrate 2 and the color filter substrate 3 is supported by the supporter 22. The heater 8 generates a heat, whilst the blower 10 blows a hot air 7 through the heat-resistive HEPA filter 9. The hot air heats the combined substrate structure 1, whereby the seal sandwiched between the thin film transistor substrate 2 and the color filter substrate 3 is also heated to cause the thermosetting of the seal.

As shown in FIG. 3, the combined substrate structure 1 is heated, whilst opposite edges of the combined substrate structure 1 are supported by the supporter 22, so that the combined substrate structure 1 is slightly bent, and a center portion of the combined substrate structure 1 becomes lower in level than the opposite edges. The slightly bending of the combined substrate structure 1 causes a displacement or a miss-alignment between the thin film transistor substrate 2 and the color filter substrate 3. In this undesirable situation, the thermosetting of the seal between the displaced or miss-aligned substrates 2 and 3 appears. The product thus has the above-described miss-alignment between the thin film transistor substrate 2 and the color filter substrate 3, resulting in the deterioration in the display quality of the product.

If a temperature of the heat chamber is further increased, then a thermal strain appears on the supporter 22, whereby displacements of the supporting positions of the supporter 22 are caused. The planarity of the combined substrate structure 1 is also deteriorated by the displacements of the supporting positions of the supporter 22.

Japanese laid-open patent publication No. 10-104564 discloses an oven which is capable of holding a device horizontal at high accuracy. The supporter for supporting the device such as substrate is made of a material having a low thermal expansion coefficient, such as a crystal glass, wherein the supporter includes a horizontally supporter and poles. Even if the temperature of the oven is risen higher, then the strain of the supporter is suppressed small, whereby the device is well supported horizontally at the relatively high accuracy. As a result, the combined substrate structure has substantially no displacement or no miss-alignment between the thin film transistor substrate 2 and the color filter substrate 3.

The above conventional oven does not ensure the planarity of the device after the thermal expansion appears on the supporter. It is difficult to suppress the thermal expansion. It is also difficult to estimate the quantity of the strain. Even if the oven temperature becomes the ordinary temperature, it is uncertain whether the supporter once thermally expanded becomes the original shape. The frequency of the temperature rise and drop causes a permanent strain of the supporter. If the thermal strain is superimposed over the permanent strain, then the planarity of the device is deteriorated, whereby the device is defective. This results in the drop of the yield.

As the size of the glass substrates is increased, then the above problem becomes more serious because the supporter size is also proportional to the substrate size. The quantity of the displacement or the miss-alignment is also generally proportional to the size of the substrate or the size of the supporter, whereby the planarity of the device is deteriorated.

Japanese laid-open patent publication No. 9-281513 discloses a method, an apparatus and a system for assembling the combined substrate structure. Alignment marks are respectively put on respective substrates which make a pair. A displacement between the respective alignment marks is measured, so that the displacement or the miss-alignment between the respective substrates is compensated. The remaining displacement or miss-alignment in pitch between the alignment marks is further reduced by deformation of the substrates.

Even if the above described conventional method is applied to the seal thermosetting apparatus, it is difficult to obtain such desirable combined substrate structure at a high accuracy in alignment, because the conventional method does not consider the thermal expansion of the seal thermosetting apparatus and the combined substrate structure.

If the displacement or the miss-alignment between the combined substrates appears and a displacement of the alignment marks is caused, it may be proposed to deform the substrates for compensation to the displacement or the miss-alignment. If, however, at this time, the thermosetting reaction has already been started, it is difficult for the deformation of the combined substrate structure to compensate the miss-alignment or the displacement because the relative position between the combined substrates through the seal is fixed. Even if the deformation of the combined substrates is forced to align the alignment marks, and the deformed shape of the combined substrate structure becomes the original shape, then the displacement or the miss-alignment is caused again.

In the above circumstances, the development of a novel apparatus for forming a combined substrate structure free from the above problems is desirable.

SUMMARY OF THE INVENTION

Accordingly, it is an object of the present invention to provide a novel apparatus for forming a combined substrate structure free from the above problems.

It is a further object of the present invention to provide a novel apparatus for forming a combined substrate structure through a thermosetting seal between pared substrates, wherein the apparatus is capable of keeping the high planarity of the combined substrate structure.

It is a still further object of the present invention to provide a novel method of forming a combined substrate structure free from the above problems.

It is yet a further object of the present invention to provide a novel method of forming a combined substrate structure through a thermosetting seal between pared substrates, wherein the apparatus is capable of keeping the high planarity of the combined substrate structure.

The present invention provides an apparatus for supporting a combined substrate structure which comprises first and second substrates combined. The apparatus includes: a plurality of level-adjustable supporting mechanism for supporting plural supporting points of a bottom surface of the combined substrate structure, the level-adjustable supporting mechanism being capable of adjusting a level thereof; a level-detecting system for detecting respective levels of corresponding points of a top surface of the combined substrate structure to the plural supporting points of the bottom surface; and a control system for receiving the detected levels from the level-detecting system and for controlling the plurality of level-adjustable supporting mechanism in respective level-adjustment operations in accordance with the detected levels.

The present invention also provides a method of supporting a combined substrate structure which comprises first and second substrates, and the combined substrate structure being supported at plural supporting points on a bottom surface thereof by a plurality of level-adjustable supporting mechanisms. The method includes: detecting respective levels of corresponding points of a top surface of the combined substrate structure to the plural supporting points of the bottom surface; and controlling the level-adjustable supporting mechanisms in respective level-adjustment operations in accordance with the detected levels.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIGS. 12A through 12E are schematic perspective views illustrative of sequential steps involved in a second novel method of combing the thin film transistor substrate and the color filter substrate in accordance with the present invention.

DETAILED DESCRIPTION OF THE PREFERRED EMBODIMENTS

Figure 1:
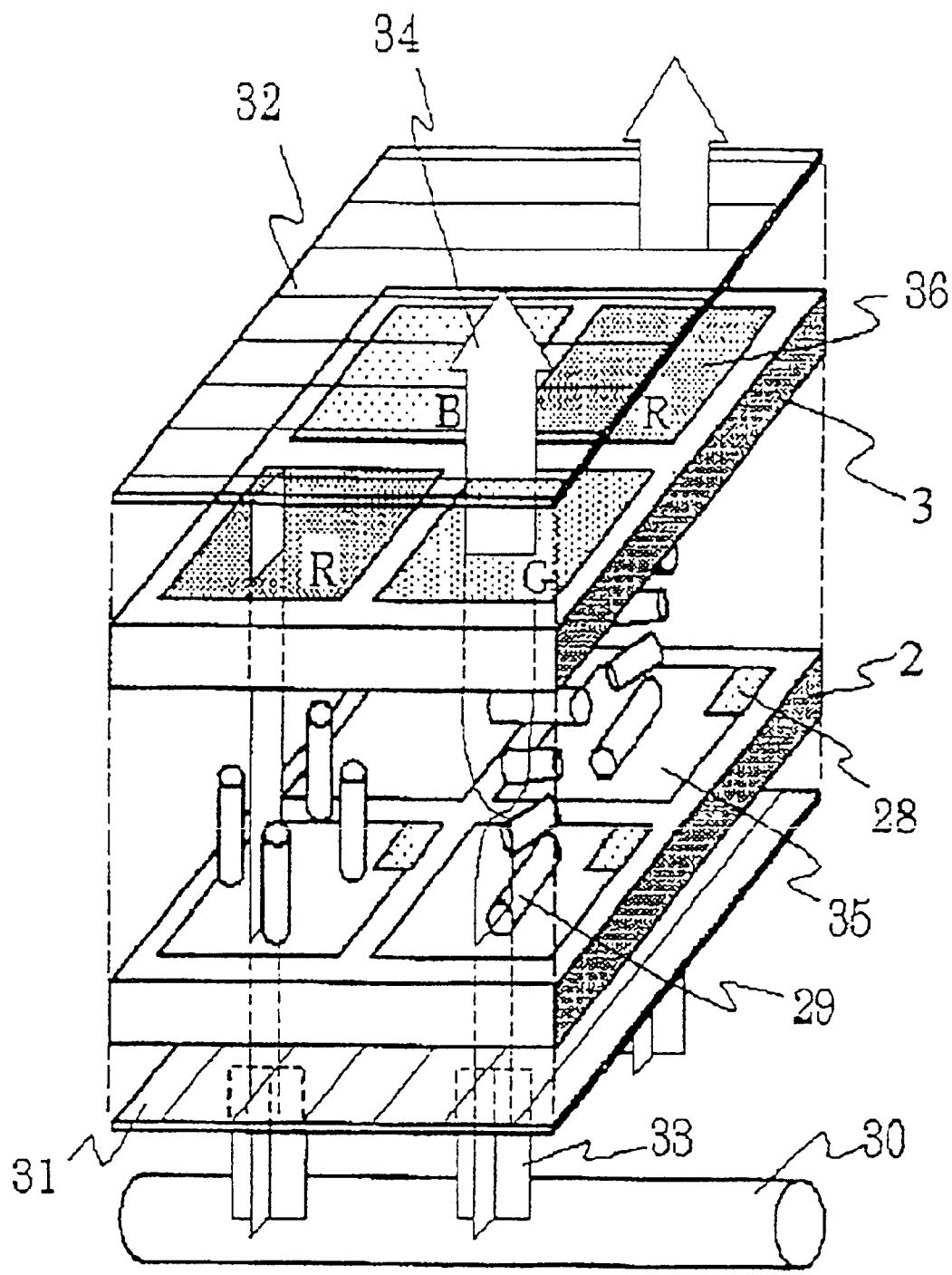
FIG. 1 is a schematic perspective view of a structure of a liquid crystal display.
Figure 2A:
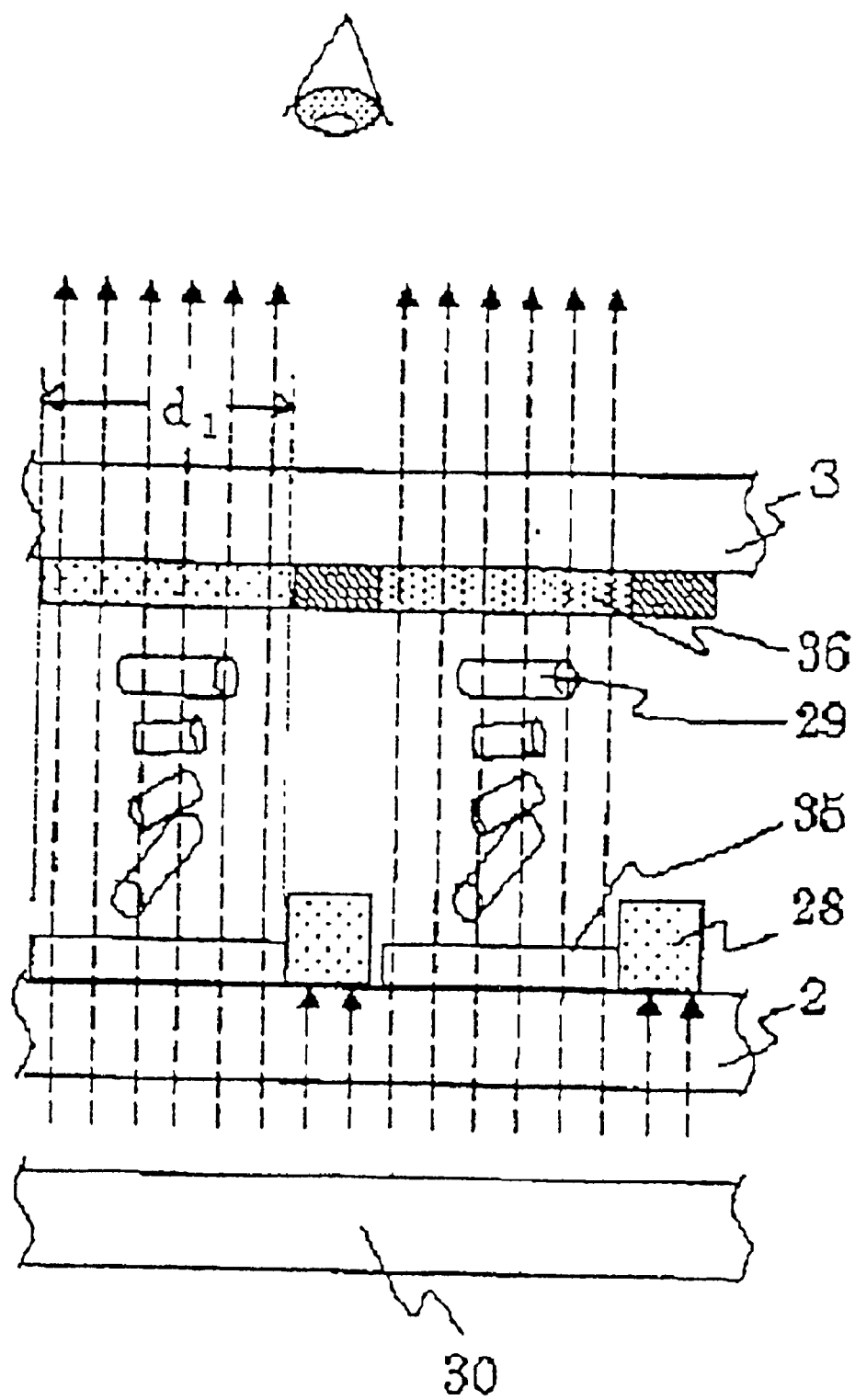
FIG. 2A is a fragmentary cross sectional elevation view of light transmissions through the liquid crystal display, wherein the thin film transistor substrate and the color filter substrate are aligned at a high accuracy.
Figure 2B:
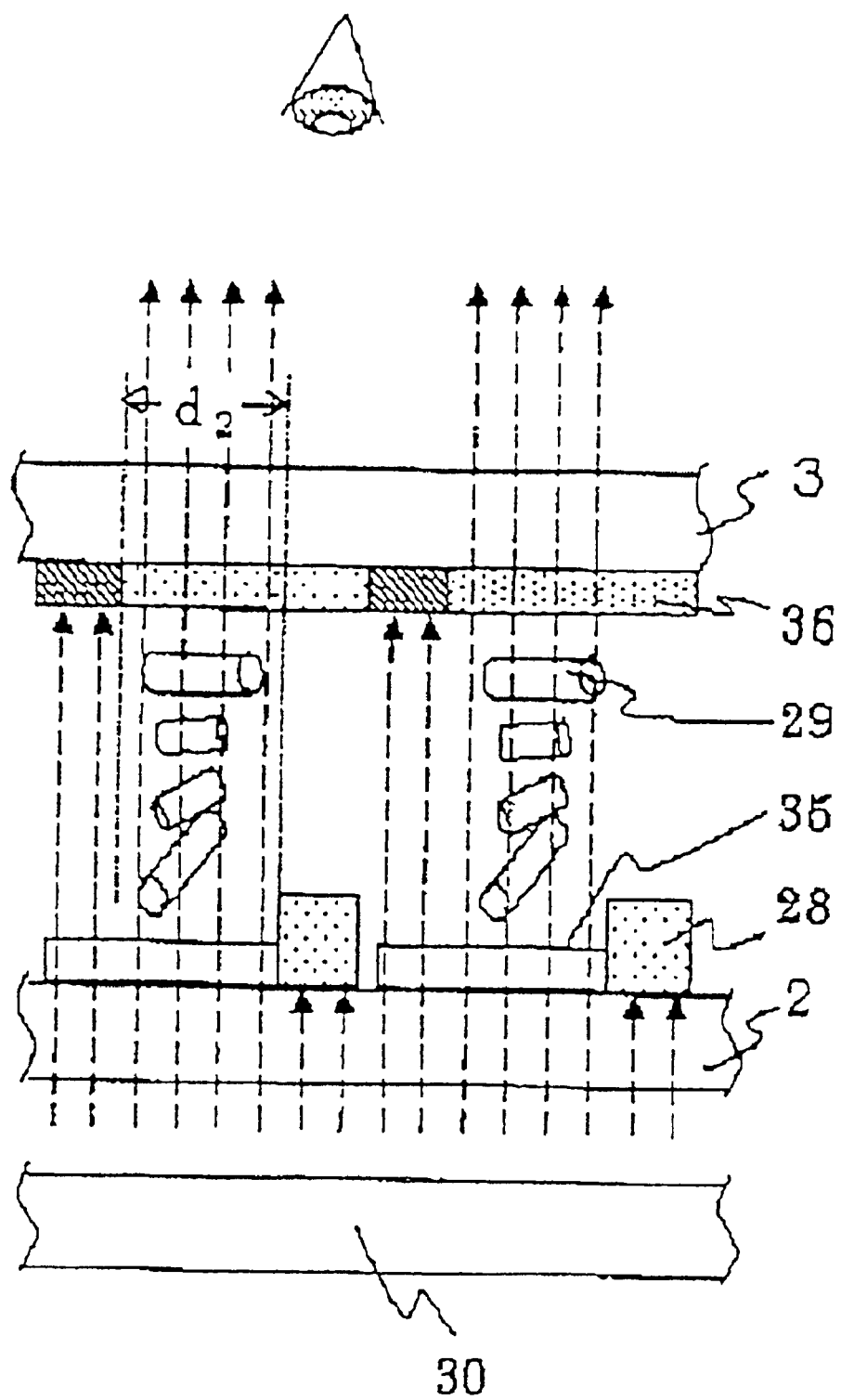
FIG. 2B is a fragmentary cross sectional elevation view of light transmissions through the liquid crystal display, wherein the thin film transistor substrate and the color filter substrate are miss-aligned at a low accuracy.

A first aspect of the present invention is an apparatus for supporting a combined substrate structure which comprises first and second substrates combined. The apparatus includes: a plurality of level-adjustable supporting mechanism for supporting plural supporting points of a bottom surface of the combined substrate structure, the level-adjustable supporting mechanism being capable of adjusting a level thereof; a level-detecting system for detecting respective levels of corresponding points of a top surface of the combined substrate structure to the plural supporting points of the bottom surface; and a control system for receiving the detected levels from the level-detecting system and for controlling the plurality of level-adjustable supporting mechanism in respective level-adjustment operations in accordance with the detected levels.

It is preferable that the control system controls the plurality of level-adjustable supporting mechanism in respective level-adjustment operations so as to suppress a flexure of the combined substrate structure within a maximum acceptable flexure value which corresponds to a maximum value of an acceptable range of a displacement between the first and second substrates.

It is further preferable that the plurality of level-adjustable supporting mechanism are arranged in a two-dimensional array under the bottom surface of the combined substrate structure.

It is further more preferable that the control system controls the plurality of level-adjustable supporting mechanism in respective level-adjustment operations so as to suppress respective flexures of divided sub-regions of the combined substrate structure within the maximum acceptable flexure value.

It is also preferable that the level-detecting system includes a two-dimensional array of level-detecting sensors which are positioned over the plurality of level-adjustable supporting mechanism.

It is also preferable that the control system controls the plurality of level-adjustable supporting mechanism in respective level-adjustment operations so as to cause the combined substrate structure to have an inverse flexure to a virtual flexure which is substantially equivalent to a displacement between the first and second substrates, where the inverse flexure is equal in absolute value to and opposite in polarity to the virtual flexure.

It is further preferable that the inverse flexure is controlled within a predetermined upper-limit value.

It is also preferable to further include: a displacement-detecting system for detecting a displacement between the first and second substrates and for sending a displacement signal which indicates a quantity of the detected displacement to the control system; and the control system receiving the displacement signal from the displacement-detecting system and controlling the plurality of level-adjustable supporting mechanism in respective level-adjustment operations in accordance with the displacement signal.

It is also preferable that the displacement-detecting system comprises a plurality of image recognition devices for recognizing a displacement between a first alignment mark of the first substrate and a second alignment mark of the second substrate, the first and second alignment marks making a pair.

It is also preferable that the plurality of image recognition devices comprise cameras.

It is also preferable that the level-adjustable supporting mechanism comprises a conveyer for mechanically supporting the combined substrate structure; and a level-adjuster for adjusting a level of the conveyer in accordance with the control signal from the control system.

It is also preferable that the level-adjuster comprises an actuator showing elevations with a controlled stroke in accordance with the control signal from the control system.

It is also preferable that the conveyer is mechanically coupled to the level adjuster so as to move following to any thermal expansion of bottom one of the first and second substrates.

It is also preferable that the conveyer rotates following to any thermal expansion of bottom one of the first and second substrates.

It is also preferable that the conveyer slides following to any thermal expansion of bottom one of the first and second substrates.

It is also preferable to further include: a heating system for heating the combined substrate structure to cause thermo-setting an adhesive sealing layer between the first and second substrate.

It is also preferable to further include: an ultraviolet ray irradiating system for irradiating an ultraviolet ray onto the combined substrate structure to cause UV-setting an adhesive sealing layer between the first and second substrate.

A second aspect of the present invention is an apparatus for supporting a combined substrate structure which comprises first and second substrates combined. The apparatus includes: a two-dimensional array of level-adjustable supporting mechanisms for supporting plural supporting points of a bottom surface of the combined substrate structure, each of the level-adjustable supporting mechanisms further comprising a conveyer for mechanically supporting the combined substrate structure; and a level-adjuster for adjusting a level of the conveyer; a two-dimensional array of level-detecting sensors positioned over the level-adjustable supporting mechanisms for detecting respective levels of corresponding points of a top surface of the combined substrate structure to the plural supporting points of the bottom surface; and a control system for receiving the detected levels from the level-detecting system and for controlling the level-adjusters in respective level-adjustment operations in accordance with the detected levels.

It is also preferable that the control system controls the level-adjusters in respective level-adjustment operations so as to suppress a flexure of the combined substrate structure within a maximum acceptable flexure value which corresponds to a maximum value of an acceptable range of a displacement between the first and second substrates.

It is also preferable that the control system controls the level-adjusters in respective level-adjustment operations so as to suppress respective flexures of divided sub-regions of the combined substrate structure within the maximum acceptable flexure value.

It is also preferable that the control system controls the level-adjusters in respective level-adjustment operations so as to cause the combined substrate structure to have an inverse flexure to a virtual flexure which is substantially equivalent to a displacement between the first and second substrates, where the inverse flexure is equal in absolute value to and opposite in polarity to the virtual flexure.

It is also preferable that the inverse flexure is controlled within a predetermined upper-limit value.

It is also preferable to further include: a displacement-detecting system for detecting a displacement between the first and second substrates and for sending a displacement signal which indicates a quantity of the detected displacement to the control system; and the control system receiving the displacement signal from the displacement-detecting system and controlling the level-adjusters in respective level-adjustment operations in accordance with the displacement signal.

It is also preferable that the displacement-detecting system comprises a plurality of image recognition devices for recognizing a displacement between a first alignment mark of the first substrate and a second alignment mark of the second substrate, the first and second alignment marks making a pair.

It is further preferable that the plurality of image recognition devices comprise cameras.

It is also preferable that each of the level-adjuster comprises an actuator showing elevations with a controlled stroke in accordance with the control signal from the control system.

It is also preferable that the conveyer is mechanically coupled to the level adjuster so as to move following to any thermal expansion of bottom one of the first and second substrates.

It is further preferable that the conveyer rotates following to any thermal expansion of bottom one of the first and second substrates.

It is also preferable that the conveyer slides following to any thermal expansion of bottom one of the first and second substrates.

It is also preferable to further include: a heating system for heating the combined substrate structure to cause thermo-setting an adhesive sealing layer between the first and second substrate.

It is also preferable to further include: an ultraviolet ray irradiating system for irradiating an ultraviolet ray onto the combined substrate structure to cause UV-setting an adhesive sealing layer between the first and second substrate.

A third aspect of the present invention is a method of supporting a combined substrate structure which comprises first and second substrates, and the combined substrate structure being supported at plural supporting points on a bottom surface thereof by a plurality of level-adjustable supporting mechanisms. The method includes: detecting respective levels of corresponding points of a top surface of the combined substrate structure to the plural supporting points of the bottom surface; and controlling the level-adjustable supporting mechanisms in respective level-adjustment operations in accordance with the detected levels.

It is also preferable that the respective level-adjustment operations are made so as to suppress a flexure of the combined substrate structure within a maximum acceptable flexure value which corresponds to a maximum value of an acceptable range of a displacement between the first and second substrates.

It is also preferable that the respective level-adjustment operations are made so as to suppress respective flexures of divided sub-regions of the combined substrate structure within the maximum acceptable flexure value.

It is also preferable that the respective level-adjustment operations are made so as to cause the combined substrate structure to have an inverse flexure to a virtual flexure which is substantially equivalent to a displacement between the first and second substrates, where the inverse flexure is equal in absolute value to and opposite in polarity to the virtual flexure.

It is also preferable that the inverse flexure is controlled within a predetermined upper-limit value.

It is also preferable to further include: detecting a displacement between the first and second substrates; and controlling the respective level-adjustment operations in accordance with the detected displacement.

It is also preferable that the step of detecting the displacement comprises recognizing a displacement between a first alignment mark of the first substrate and a second alignment mark of the second substrate, the first and second alignment marks making a pair.

Figure 4:
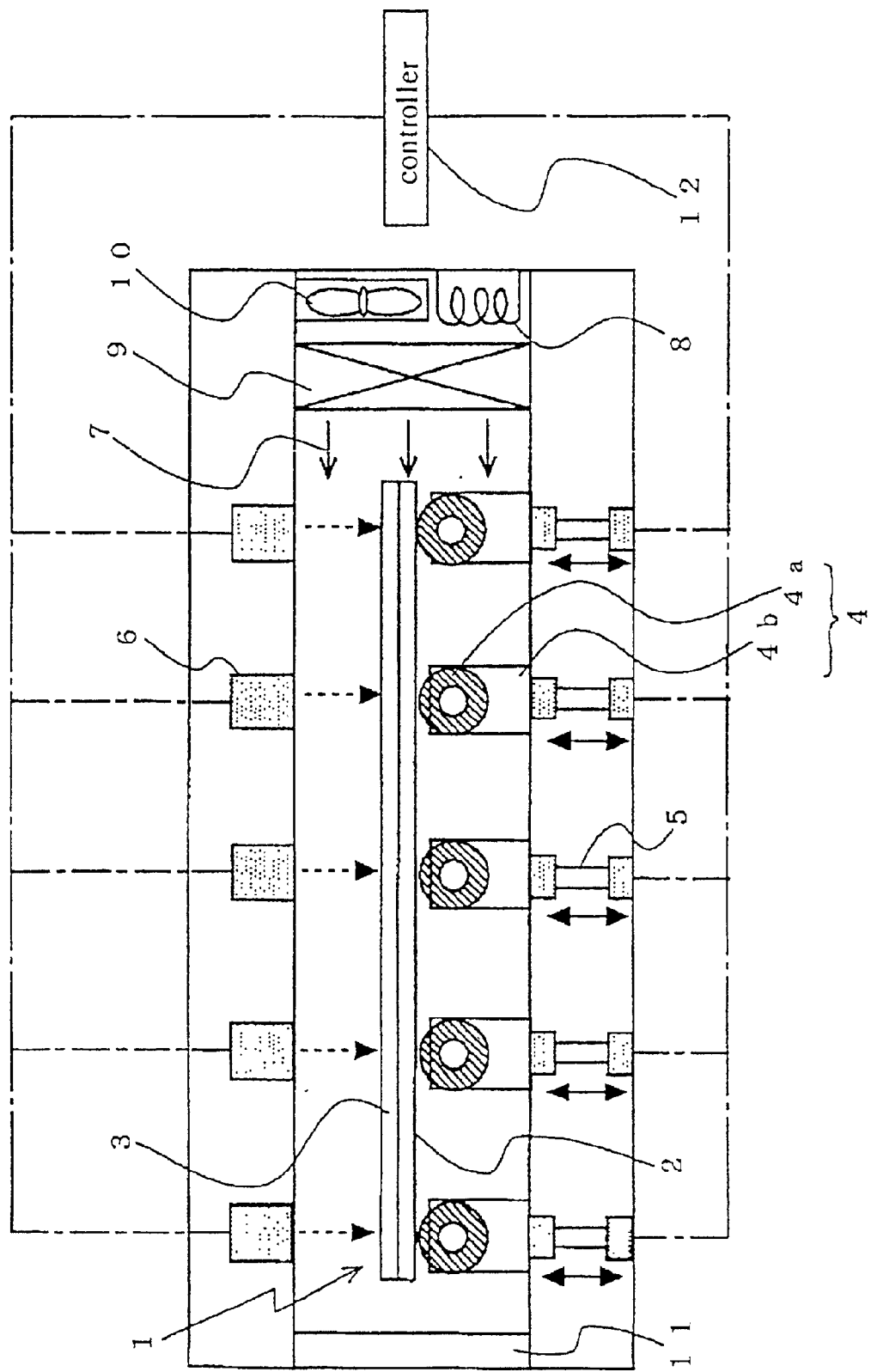
FIG. 4 is a schematic block diagram in a side view of an apparatus for forming a combined substrate structure for a liquid crystal display in a first embodiment in accordance with the present invention.
Figure 5:
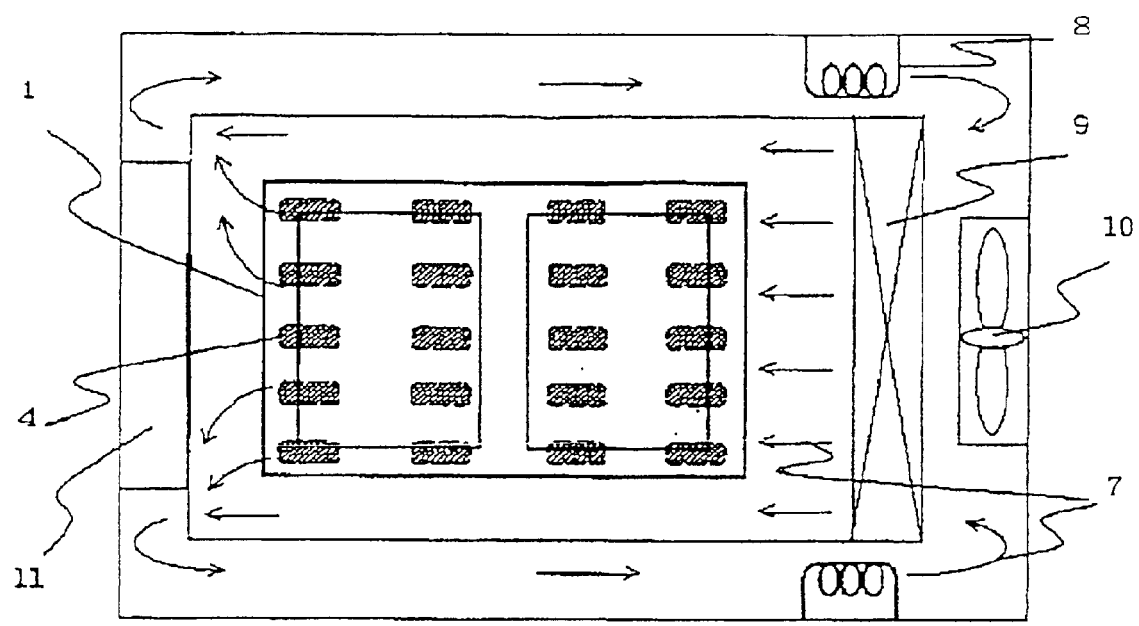
FIG. 5 is a schematic block diagram in a plane view of the apparatus shown in FIG. 4.

First Embodiment:

A first embodiment according to the present invention will be described in detail with reference to the drawings. FIG. 4 is a schematic block diagram in a side view of an apparatus for forming a combined substrate structure for a liquid crystal display in a first embodiment in accordance with the present invention. FIG. 5 is a schematic block diagram in a plane view of the apparatus shown in FIG. 4.

A combined substrate structure 1 comprises first and second substrates 2 and 3. The first substrate 2 is a thin film transistor substrate 2. The second substrate 3 is a color filter substrate 3. The thin film transistor substrate 2 comprises a glass substrate having a dot-matrix array of plural pairs of a transparent electrode and a thin film transistor. The color filter substrate 3 also has a dot-matrix array of color filters of three primary colors, for example, red, green and blue. The thin film transistor substrate 2 and the color filter substrate 3 are bonded through a seal thermosetting process for thermosetting a seal as an adhesive agent between the thin film transistor substrate 2 and the color filter substrate 3. The seal thermosetting process may be realized by a heat treatment for 30–60 minutes.

The apparatus includes an entrance 11, heaters 8, a heat-resistive HEPA filter 9 and a blower 10. The heaters 8 generate a heat, whilst the blower 10 blows a hot air 7 through the heat-resistive HEPA filter 9 in a first horizontal direction. The hot air heats the combined substrate structure 1, whereby the seal sandwiched between the thin film transistor substrate 2 and the color filter substrate 3 is also heated to cause the thermosetting of the seal. The apparatus also includes a hot air re-cycling system for allowing that the hot air is blown through the combined substrate structure and returned to the heaters 8.

The apparatus also includes the following supporting mechanism for supporting the combined substrate structure. The supporting mechanism comprises a matrix array of plural pairs of a conveyer 4 and a level adjuster 5. The conveyer 4 is provided on a top of the level adjuster 5 for allowing the level adjuster 5 to adjust the level of the conveyer 4. Namely, each of the conveyers 4 is movable in vertical or elevation direction. The plural level adjusters 5 are operable independently from each other, for independent level adjustments of the plural conveyers 4.

Each of the level adjusters 5 may optionally comprise an actuator which elevates the conveyer 4 with a controlled stroke.

Each of the conveyers 4 further comprises a ring member 4a and a supporting member 4b for supporting the ring member 4a. A top of the ring member 4a is in contact directly with the bottom surface of the combined substrate structure 1.

The apparatus also includes a matrix array of plural level sensors 6 which are positioned over the conveyers 4 for measuring relative levels from a reference level of respective positions of the combined substrate structure 1. Each of the level sensors 6 is further electrically coupled to a controller 12 for sending level-detected signals to the controller 12, wherein the each level detected signal designates the measured level of the measured position of the combined substrate structure 1 from the reference level. The controller 12 analyzes respective level data included in the level detected signals received from the plural level sensors 6 and generate respective control signals based on the analysis of the level data.

Each of the level adjusters 5 is also electrically coupled to the controller 12 for receiving the control signal from the controller 12, so that the each level adjuster 5 adjusts the level of the paired conveyer 4 for the purpose of always keeping the high planarity of the combined substrate structure 1. The above novel apparatus reduces and/or eliminates the displacement or miss-alignment of the combined substrate structure 1.

The combined substrate structure 1 is carried through the entrance into the oven, wherein the combined substrate structure 1 is supported over the matrix array of the plural conveyers 4. The heaters 8 generate a hot air 7. The blower 10 blows the hot air 7 through the heat-resistive HEPA filter 9 to the combined substrate structure 1. The hot air heats the combined substrate structure 1, whereby the seal between the thin film transistor substrate 2 and the color filter substrate 3 shows a thermosetting phenomenon, wherein the combined substrate structure 1 is kept at the high planarity by the above substrate supporting mechanism. This allows a highly accurate alignment between the thin film transistor substrate 2 and the color filter substrate 3. If the combined substrate structure 1 is used for the liquid crystal display, then a desirable high light-transmittivity and a desirable high display quality can be obtained.

The most influential factor for deteriorating the accuracy in alignment or displacement between the thin film transistor substrate 2 and the color filter substrate 3 is the flexure of the combined substrate structure 1. An interrelationship between the flexure of the combined substrate structure 1 and the accuracy in alignment or displacement between the thin film transistor substrate 2 and the color filter substrate 3 will be described with reference again to FIGS. 3 and 4. As described above, FIG. 3 shows the conventional apparatus for forming the combined substrate structure 1, whilst FIG.

4 shows the novel apparatus for forming the combined substrate structure 1.

Figure 3:
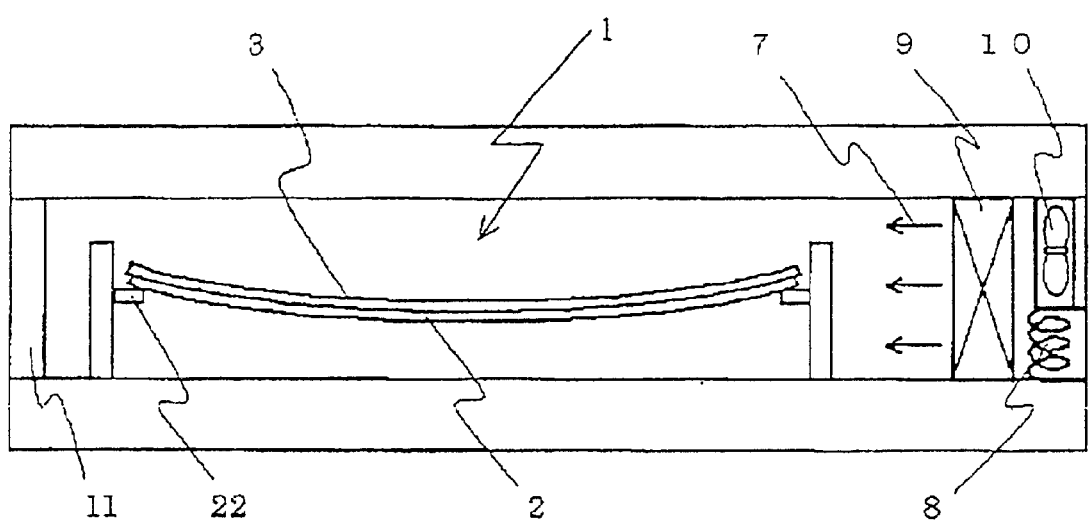
FIG. 3 is a schematic view illustrative of the seal thermosetting apparatus for bonding the thin film transistor substrate and the color filter substrate.

As shown in FIG. 3, the combined substrate structure 1 is supported at its opposite edges by the supporter 22, wherein the combined substrate structure 1 has a relatively large flexure, whereby there appears a displacement or a miss-alignment between the thin film transistor substrate 2 and the color filter substrate 3. In this state, the thermosetting process is carried out, then the thin film transistor substrate 2 and the color filter substrate 3 are fixed or bonded with the undesirable miss-alignment and flexure. Even if this combined substrate structure is forced to be planer, then the miss-alignment still remains. As a result, the accuracy in alignment between the thin film transistor substrate 2 and the color filter substrate 3 is deteriorated. If such the combined substrate structure 1 is used for the liquid crystal display, then the display is defective.

With reference to FIG. 4, the combined substrate structure 1 is supported at its entire bottom surface region by the matrix array of the conveyers 4 provided on the tops of the respectively paired level adjusters 5, wherein the combined substrate structure 1 has the desirable high planarity without any substantive flexure. No deterioration in the accuracy in the alignment between the thin film transistor substrate 2 and the color filter substrate 3 is caused.

In accordance with the present invention, the quantity of the displacement or the miss-alignment between the thin film transistor substrate 2 and the color filter substrate 3 is calculated from the flexure quantity "a" of the combined substrate structure 1. The level adjustments of the plural level adjusters 5 are taken place depending on the flexure quantity "a" of the combined substrate structure 1, whereby the level adjustments at the plural positions of the combined substrate structure 1 are taken place depending on the flexure quantity "a" of the combined substrate structure 1.

Figure 6:
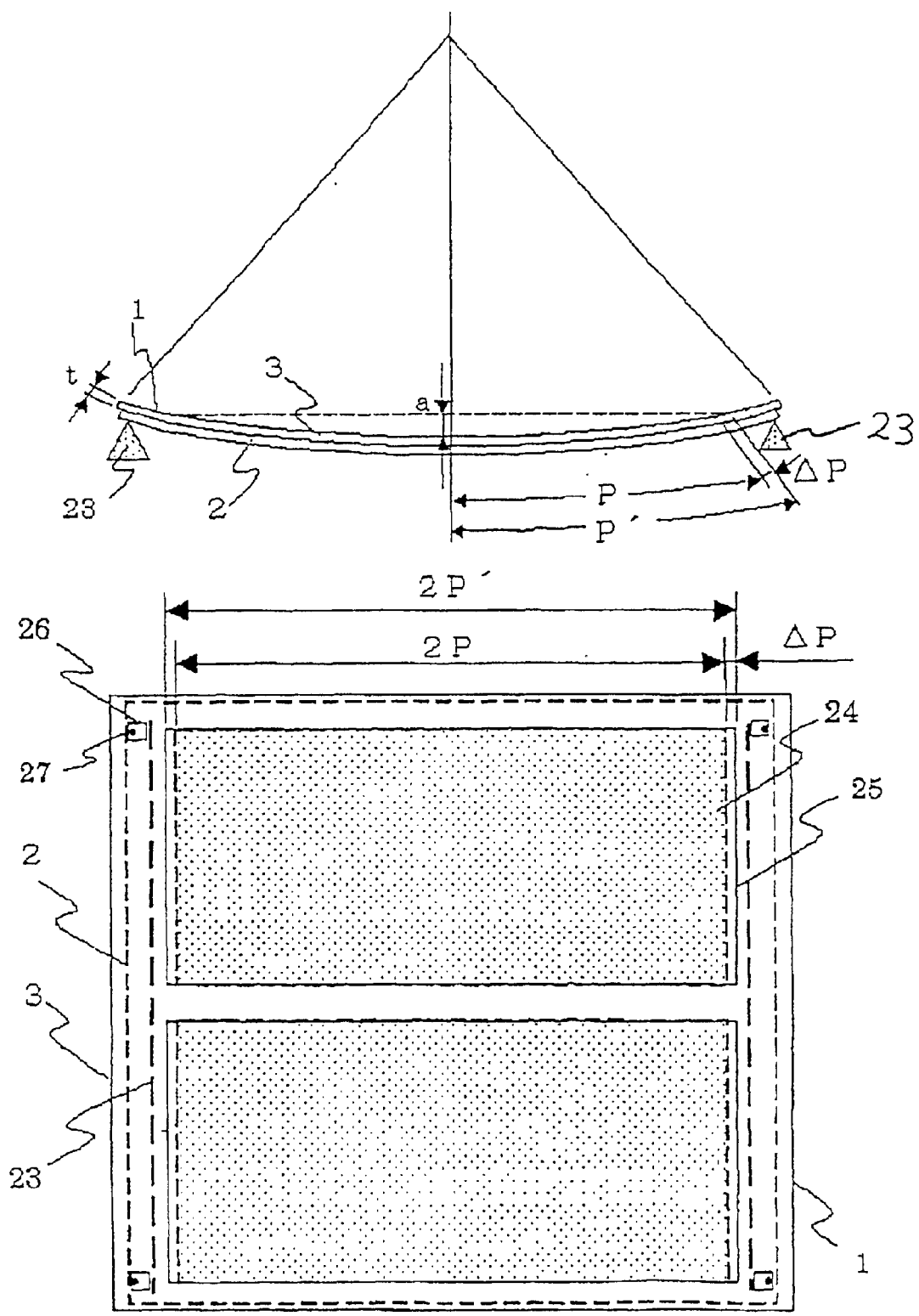
FIG. 6 is a view illustrative of an inter-relationship between the flexure amount "a" of the combined substrate structure and a displacement or miss-alignment between the thin film transistor substrate and the color filter substrate.

FIG. 6 is a view illustrative of an inter-relationship between the flexure amount "a" of the combined substrate structure and a displacement or miss-alignment between the thin film transistor substrate and the color filter substrate.

As shown in FIG. 6, the combined substrate structure 1 is supported at its opposite ends by supporting points 23, wherein the combined substrate structure 1 has a flexure "a" at a center position thereof. It is generally known that if a beam is supported at its opposite ends, then the beam has a flexure "y(x)" at a position having a distance "x" from the supporting point, wherein the flexure "y(x)" is a function of the distance "x" from the supporting point. Namely, the flexure "y(x)" is given by the following equation:

$$y(x) = (wx/24EI)(x^3 - 2Lx^2 + L^3)$$

where "w" is the uniformly distributed load, "E" is the Young's modulus, "I" is the geometrical moment of inertia, and "L" is the length of the beam. The shape of the beam with the flexure "y(x)" is represented by the curve of the fourth order. This shape of the beam with the flexure "y(x)" is approximated by a circular arc for facilitation of the calculation. This approximation is no problem because the radius of curvature is extremely larger.

The following description will focus on the interrelationship between the approximated flexure "a" and a displacement "ΔP" between the thin film transistor substrate 2 and the color filter substrate 3. The color filter substrate 3 overlies the thin film transistor substrate 2. The color filter substrate 3 has a thickness "t". The color filter substrate 3 has a flexure "a" at a center position thereof. The color filter substrate 3 has a length "2P" provided that the color filter substrate 3 is free of any flexure. If the combined substrate structure 1 has the flexure, then an upper surface of the thin film transistor substrate 2 has a length 2P, whilst a lower surface of the color filter substrate 3 is extended to a length 2P' which is longer than its original length 2P. Since a gap between the thin film transistor substrate 2 and the color filter substrate 3 is about 5 micrometers, then the gap is approximated to be zero.

The displacement "ΔP" between the thin film transistor substrate 2 and the color filter substrate 3 is given by:

$$\Delta P = P' - P \qquad (1)$$
$$= t(\pi - 2\cos^{-1}(a/P))$$

Figure 7:
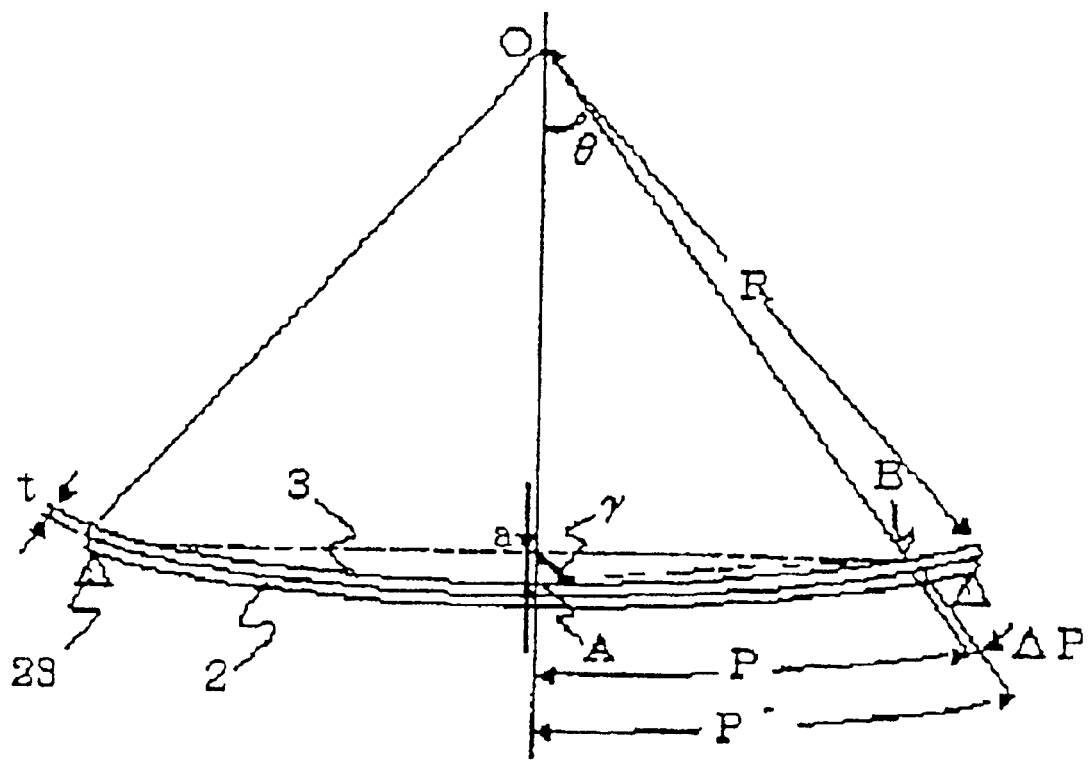
FIG. 7 is a view illustrative of an inter-relationship between the flexure amount "a" of the combined substrate structure and a displacement or miss-alignment between the thin film transistor substrate and the color filter substrate.

The equation (1) is obtained by the followings steps with reference to FIG. 7 which is a view illustrative of an inter-relationship between the flexure amount "a" of the combined substrate structure and a displacement or miss-alignment between the thin film transistor substrate and the color filter substrate.

In the first step, an angle "θ" is decided from the length "2P" of the upper surface of the thin film transistor substrate 2 and the flexure "a" at the center of the color filter substrate 3, provided that a segment "A–B" is approximated to be a length "P".

$$P \cos \gamma = a \rightarrow \gamma = \cos^{-1}(a/P)$$

Since the triangle "OAB" is the isosceles triangle, θ=π−2γ

In the second step, the radius "R" of curvature is founded. Since Rθ=P, then R=P/θ.

In the third step, the length "P'" being one half of the length "2P'" of the lower surface of the color filter substrate 3 is founded, provided that an extremely small gap of 5 micrometers between the thin film transistor substrate 2 and the color filter substrate 3 is approximated to be zero.

$$P' = (R+t)\theta$$

In the fourth step, the displacement "ΔP" between the thin film transistor substrate 2 and the color filter substrate 3 is founded, provided that the length of the upper surface of the thin film transistor substrate 2 is fixed at "P" which is the reference value, whilst the length of the lower surface of the color filter substrate 3 is extended from "P" to "P'", where P' is larger than P.

$$\Delta P = P' - P$$
$$= (R+t)\theta - P$$
$$= (P/\theta + t)\theta - P$$
$$= t\theta$$

$$\theta = \pi - 2\gamma$$
$$= \pi - 2\cos^{-1}(a/P)$$

$$\Delta P = t\theta \qquad (1)$$
$$= t(\pi - 2\cos^{-1}(a/P))$$

The above equation (1) will be investigated by comparing the examination result by use of samples of the products and the calculated results by use of the equation (1) under conditions that the length "2P"=300 mm, the thickness "t"=0.7 mm, and the flexure "a"=1.3 mm.

TABLE 1

|  | Excremental result | Calculation result |
|---|---|---|
| 2P: length (mm) | 300 | ← |
| t: thickness (mm) | 0.7 | ← |
| a: flexure (mm) | 1.3 | ← |
| ΔP: displacement (μm) | 10 | 11.7 |

The sample of the product was formed. The displacement ΔP=10 micrometers was confirmed in the examination. The calculated displacement ΔP was 11.7 micrometers. A difference between the sample and the calculation was just 1.7 micrometers. This means that the above equation (1) is available for almost correctly introducing the displacement ΔP.

Subsequent descriptions will focus on a method of controlling the planarity of the combined substrate structure by utilizing the inter-relationship between the flexure "a" and the displacement ΔP calculated by the above equation (1).

The equation (1) is solved for the flexure "a" to obtain the following equation (2).

$$a = P \sin(\Delta P/2t) \qquad (2).$$

A regulation value ΔP0 for the displacement of the product is substituted into the above equation (2) to obtain a flexure "a0".

$$a0 = P \sin(\Delta P0/2t) \qquad (3).$$

The flexure "a0" obtained from the equation (3) defines an acceptable flexure for falling the displacement into the regulation value ΔP0. Namely, the respective levels or heights of the conveyers 4 are so adjusted that the flexure "a" of the combined substrate structure 1 is fallen within the acceptable flexure "a0".

The following table 2 shows one example of the calculations, provided that if the displacement ΔP0=±4 micrometers is the regulation for the products, there was calculated the acceptable flexure "a0" for falling the displacement ΔP into the displacement ΔP0=±4 micrometers.

TABLE 2

|  | Calculation results | | |
|---|---|---|---|
| 2P: length (mm) | 150 | 300 | 680 |
| t: thickness (mm) | 0.7 | ← | ← |
| ΔP0: displacement (μm) | 4 | ← | ← |
| a0: flexure (mm) | 0.21 | 0.43 | 0.97 |

As shown on the table 2, if 2P=150 mm and t=0.7 mm, then the respective levels or heights of the conveyers 4 are so adjusted that "a0"≦0.21 mm. If 2P=300 mm and t=0.7 mm, then the respective levels or heights of the conveyers 4 are so adjusted that "a0"≦0.43 mm. If 2P=680 mm and t=0.7 mm, then the respective levels or heights of the conveyers 4 are so adjusted that "a0"≦0.97 mm.

It was know that as the size of the combined substrate structure 1 is large, then the productivity is likely to be high. The size 370 mm×470 mm of the combined glass substrate was the mainstream about few years ago. Thereafter, the size of the glass substrate has been on the increase up to 680 mm×880 mm, and further to 730 mm×920 mm.

If the combined substrate structure with the length 2P=680 mm is supported at its opposite ends, then the flexure is beyond "a"=20 mm. The calculation result shown on the table 2 means that in order to suppress the displacement of the combined substrate structure with 2P=680 mm into ±4 micrometers, it is necessary that the acceptable flexure "a0" is 0.97 mm. This means it difficult for supporting only the opposite ends of the combined substrate structure that the displacement is suppressed within the regulation. In order to suppress the flexure into the minimum, it is essential that the combined substrate structure is supported at not only the opposite ends but also at plural positions between the opposite ends.

Figure 8:
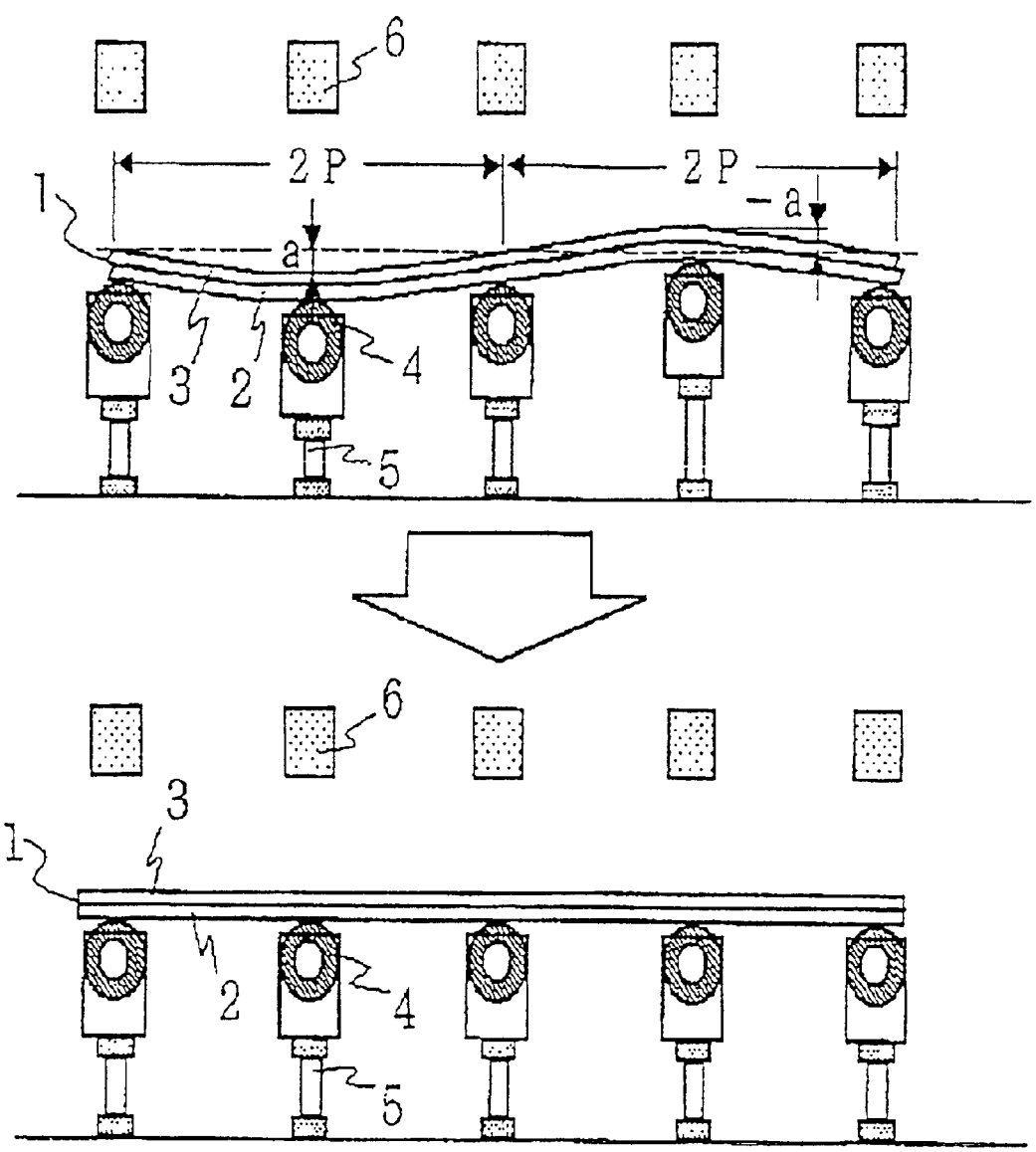
FIG. 8 is a fragmentary side view illustrative of the level adjustments of the combined substrate structure by the two-dimensional matrix array of the conveyers which are adjustable in respective levels by the plural level adjusters in accordance with the detected level values by the two-dimensional matrix array of the sensors.
Figure 9:
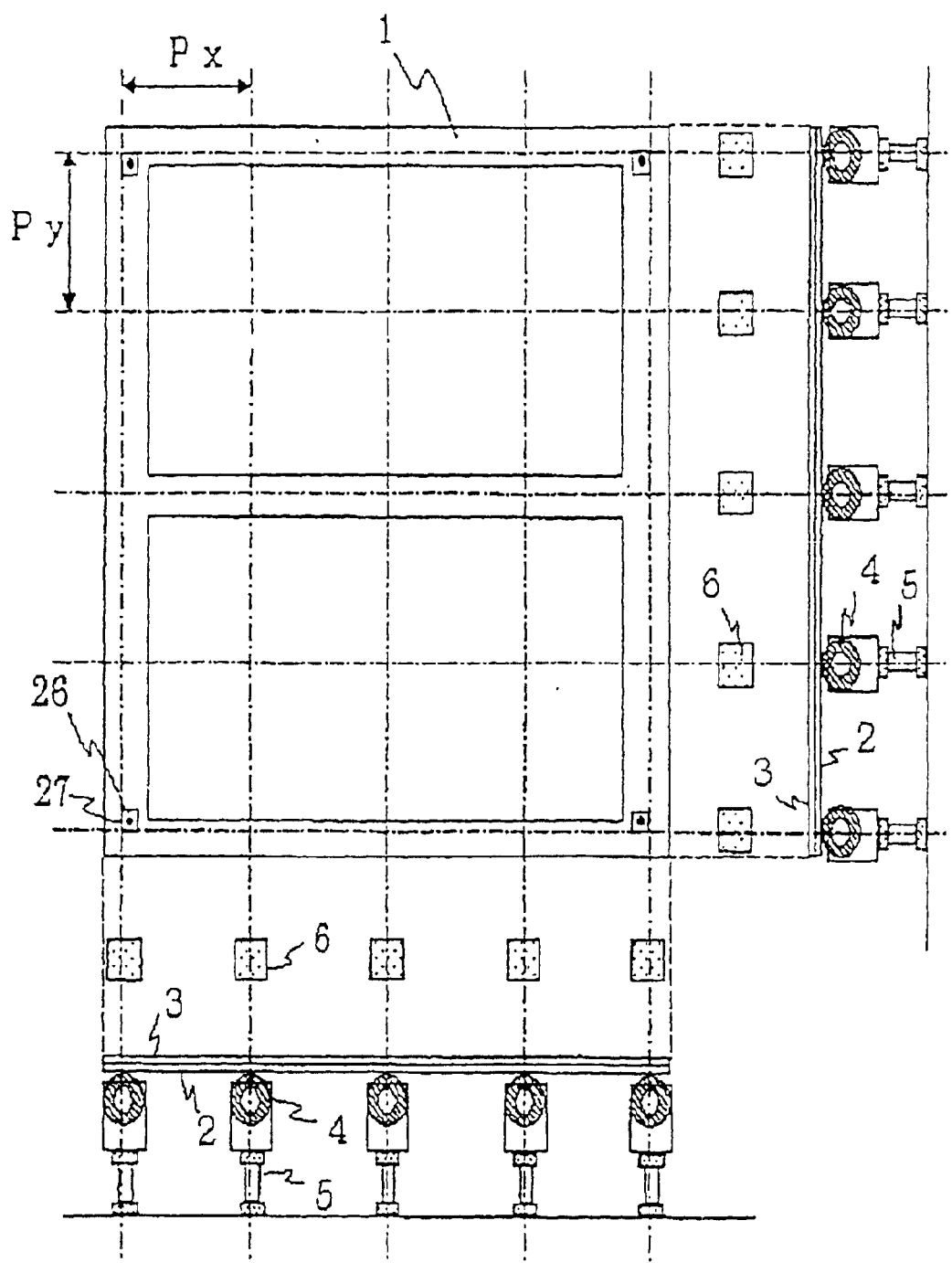
FIG. 9 is an expansion diagram illustrative of FIG. 8.

FIG. 8 is a fragmentary side view illustrative of the level adjustments of the combined substrate structure by the two-dimensional matrix array of the conveyers which are adjustable in respective levels by the plural level adjusters in accordance with the detected level values by the two-dimensional matrix array of the sensors. FIG. 9 is an expansion diagram illustrative of FIG. 8.

If the combined substrate structure 1 has a large size and is supported at many supporting points by the conveyers 4, then the combined substrate structure 1 has complicated flexures which can not be approximated by a single circular arc. In this case, the combined substrate structure 1 is divided into plural parts having respective flexures, wherein each of the plural divided parts has a simple flexure which can be approximated by the single circular arc, whereby the complicated flexures of the combined substrate structure 1 are considered to be the combination of the plural different simple-shaped flexures, each of which can be approximated by the plural circular arcs. The respective acceptable flexure value "a0" is set for each of the divided parts "2P".

If the apparatus is applied to the combined substrate structure with the larger size, then it is preferable to increase the number of the pairs of the conveyers 4 and the level adjusters 5 as well as the number of the corresponding sensors 6.

As shown in FIG. 9, the combined substrate structure 1 is two-dimensionally divided into a matrix array of sub-parts, each of which has a size of Px in a first horizontal direction and Py in a second horizontal direction perpendicular to the first horizontal direction. Each of the sub-parts has a first acceptable flexure "ax0" and a second acceptable flexure "ay0". The first acceptable flexure "ax0" is the flexure along the first horizontal direction and defined between adjacent two of the conveyers 4 aligned in the first horizontal direction. The second acceptable flexure "ay0" is the flexure along the second horizontal direction and defined between adjacent two of the conveyers 4 aligned in the second horizontal direction.

In accordance with the present invention, the combined substrate structure 1 is divided into a two-dimensional matrix array of sub-parts, each of which has the first and second acceptable flexures "ax0" and "ay0", so that the respective first and second acceptable flexures "ax0" and "ay0" are adjusted or controlled for each of the sub-parts of the combined substrate structure 1.

It should be noted that even if the flexure "a" of the combined substrate structure 1 becomes zero, then it is possible that the displacement ΔP is not zero because prior to the seal thermosetting process, there has been present the miss-alignment between the thin film transistor substrate 2 and the color filter substrate 3, or errors on the patterns of the thin film transistor substrate 2 and the color filter substrate 3.

The novel apparatus of the present invention is, however, capable of improving the accuracy in the alignment or reducing the displacement between the thin film transistor substrate 2 and the color filter substrate 3, even if prior to the seal thermosetting process, there has been present the miss-alignment between the thin film transistor substrate 2 and the color filter substrate 3, or errors on the patterns of the thin film transistor substrate 2 and the color filter substrate 3.

Figure 10:
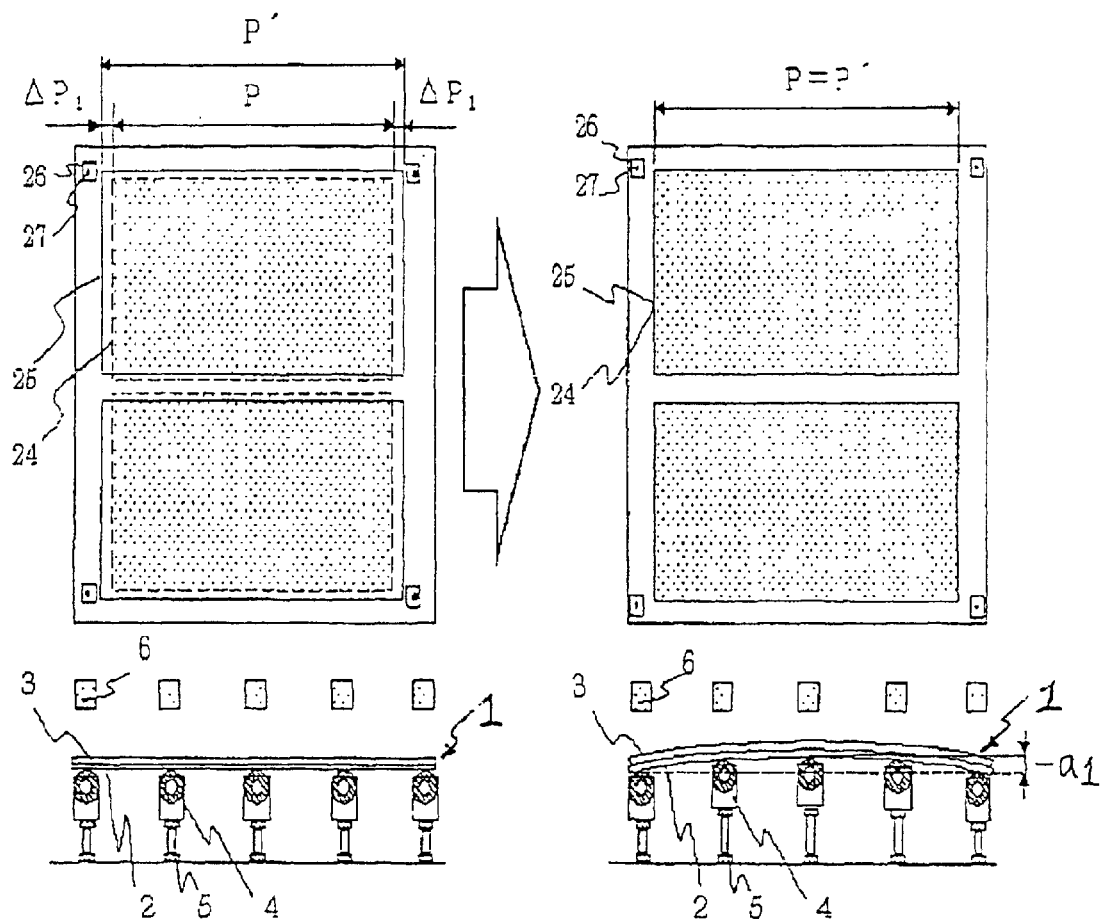
FIG. 10 is a view illustrative of the novel method of improving the accuracy in the alignment or reducing the displacement between the thin film transistor substrate and the color filter substrate in accordance with the present invention.

FIG. 10 is a view illustrative of the novel method of improving the accuracy in the alignment or reducing the displacement between the thin film transistor substrate and the color filter substrate in accordance with the present invention.

As illustrated in the left half region of FIG. 10, the combined substrate structure 1 has the exact planarity or has zero flexure "a=0", whilst the combined substrate structure 1 has the displacement ΔP1 because the color filter substrate 3 is longer by 2ΔP1 than a thin film transistor substrate 2 which underlies the color filter substrate 3.

If ΔP1 is substituted into the equation (2), then the following equation (4) can be obtained.

$$"a1"=P \sin(\Delta P1/2t) \qquad (4)$$

where "a1" is the virtual flexure which is not the real flexure. Namely, as illustrated in the left half region of FIG. 10, the combined substrate structure 1 has the exact planarity and is free of any real flexure, but the combined substrate structure 1 has the displacement 2ΔP1, for which reason it may be considered that the combined substrate structure 1 has the virtual flexure "a1".

As shown in the right half region of FIG. 10, in order to reduce this virtual flexure "a1" for the purpose of compensating the displacement 2ΔP1, the level adjusters 5 are so operated that the side conveyers 4 supporting the opposite sides of the combined substrate structure 1 become level down by an inverse flexure "−a1" to the virtual flexure "a1", wherein an absolute value of the inverse flexure "−a1" is equal to an absolute value of the virtual flexure "a1", whilst the center conveyer 4 supporting the center of the combined substrate structure 1 remains unchanged in its level, and further the remaining conveyers 4 between the center conveyer 4 and the opposite side conveyers 4 supporting the positions between the center and the opposite ends of the combined substrate structure 1 becomes level down into an intermediate level between the original level which is the same as the level of the center conveyer 4 and the dropped-levels by the inverse flexure "−a1" of the opposite side conveyers 4. As a result, the combined substrate structure 1 becomes having a real flexure which may be approximated to be a single circular arc, wherein the opposite ends of the combined substrate structure 1 become lower in level than the center thereof, whereby the upper surface of the thin film transistor substrate 2 becomes longer by ΔP1 than the lower surface of the color filter substrate 3 so as to eliminate the virtual flexure "a1" and the displacement ΔP1 from the combined substrate structure 1.

Namely, the level adjustments are made under the operations of the level adjusters 5 to form the inverse flexure "−a1" as the real flexure of the combined substrate structure 1, so that the displacement ΔP1 becomes zero, thereby eliminating the miss-alignment or displacement between the thin film transistor substrate 2 and the color filter substrate 3.

In the above example shown in the left half region of FIG. 10, the combined substrate structure 1 has the original shape of the exact planarity free of the flexure. Notwithstanding, it is, in case, possible that the original shape of the combined substrate structure 1 has the flexure. In this case, it is preferable to set an upper-limit of the stroke (−a1) of the level adjuster 5 for limiting the level adjustment quantity of the conveyer 4, so as to prevent the change in shape of the combined substrate structure 1 from providing any deterioration to the quality of the final product.

It is difficult to make the displacement ΔP into zero after the seal thermosetting process has been completed, because the thin film transistor substrate 2 and the color filter substrate 3, which have been fixed to each other upon the seal thermosetting process, have no relative displacement between them. Even if the combined substrate structure 1 is forced to have the flexure so that respective alignment marks are aligned to each other, then after the combined substrate structure 1 returns to the original shape free of the flexure, then the respective alignment marks are displaced from each other, and the displacement still exits.

It is important for the level adjustment operations by the level adjusters 5 to the conveyers 4 that the displacement ΔP is made into zero before the seal thermosetting process is completed, and also that the attitude of the combined substrate structure remains unchanged during the seal thermosetting process.

As described above, the novel apparatus for forming the combined substrate structure includes the two-dimensional array of the conveyers which support entirely the bottom surface of the combined substrate structure, the level adjusters mechanically coupled with the conveyers for adjusting the conveyers respectively, the level sensors for detecting the levels of respective points of the combined substrate structure, and the controller electrically coupled to the level adjusters and the level sensors for automatically controlling or adjusting the flexure of the combined substrate structure. The apparatus is capable of not only keeping the accuracy in alignment of the combined substrate structure during the seal thermosetting process but also forcing the combined substrate structure to have such a flexure as to compensate the displacement between the thin film transistor substrate and the color filter substrate.

The above thin film transistor substrate and the color filter substrate may be combined by the following method utilizing the above described novel apparatus. FIGS. 11A through 11E are schematic perspective views illustrative of sequential steps involved in a first novel method of combing the thin film transistor substrate and the color filter substrate in accordance with the present invention.

Figure 11A:
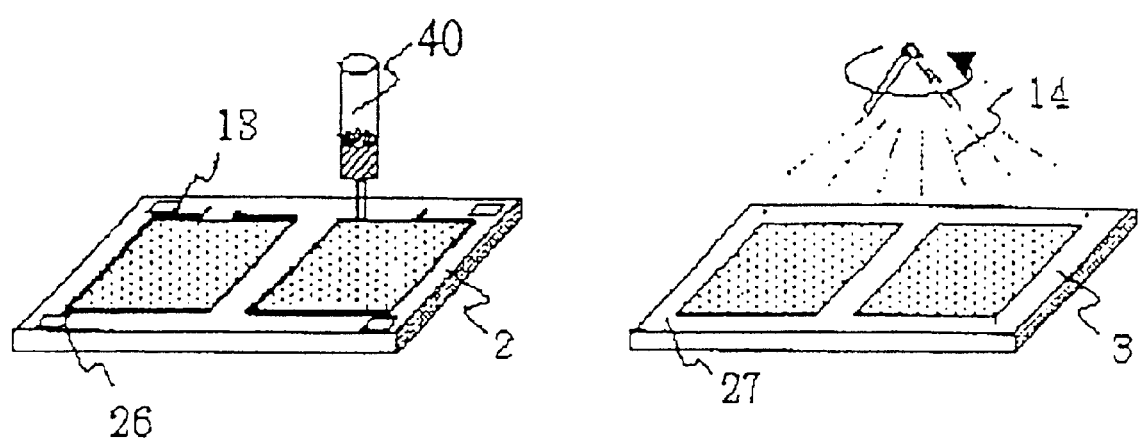
FIGS. 11A through 11E are schematic perspective views illustrative of sequential steps involved in a first novel method of combing the thin film transistor substrate and the color filter substrate in accordance with the present invention.

With reference to FIG. 11A, a seal 13 is applied onto a surface of the thin film transistor substrate 2 by an applicator 40. A spacer 14 is dispersed onto a surface of the color filter substrate 3. The seal 13 serves as an adhesive agent. The spacer 14 serves to form a gap between the thin film transistor substrate 2 and the color filter substrate 3. The spacer 14 comprise spherical particles having an averaged diameter of about 5 micrometers.

Figure 11B:
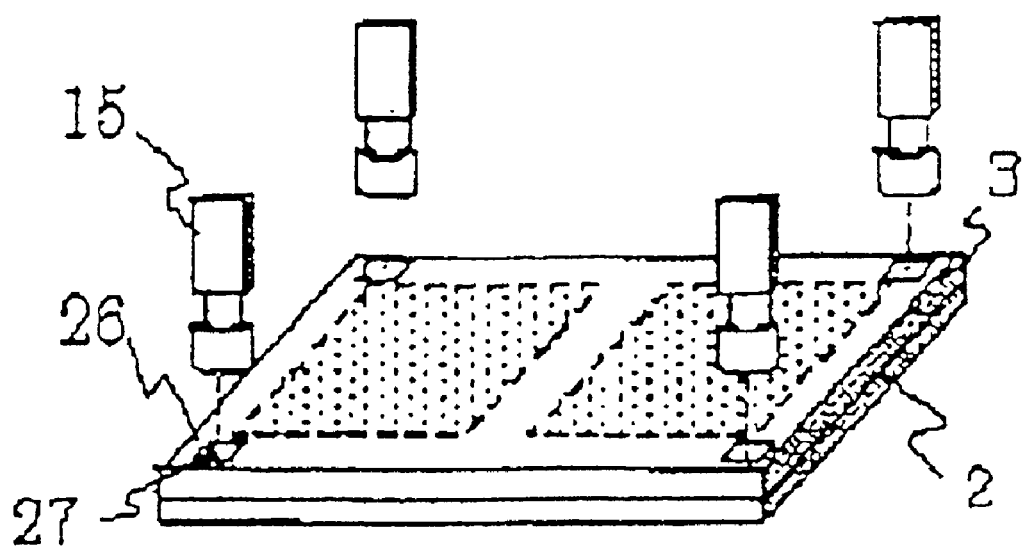

With reference to FIG. 11B, the color filter substrate 3 is placed on the thin film transistor substrate 2, so that a center of each of four alignment marks 26 at four corners of the thin film transistor substrate 2 is aligned to a center of corresponding one of four alignment marks 27 at four corners of the color filter substrate 3. These alignments are confirmed by four cameras 15. The accuracy in the alignment is within ±2 micrometers.

Figure 11C:
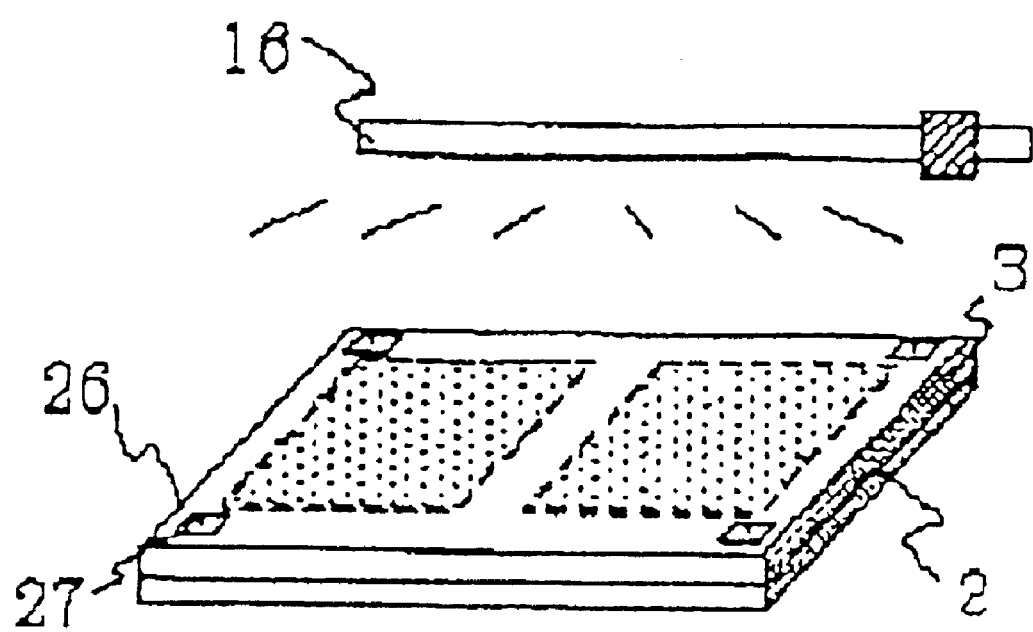

With reference to FIG. 11C, an ultraviolet ray is irradiated from an ultraviolet ray source 16 onto part of entirety of the seal 13 for causing a provisional setting of the seal 13, so as to prevent any dislocation between the thin film transistor substrate 2 and the color filter substrate 3 during a subsequent main thermosetting process.

Figure 11D:
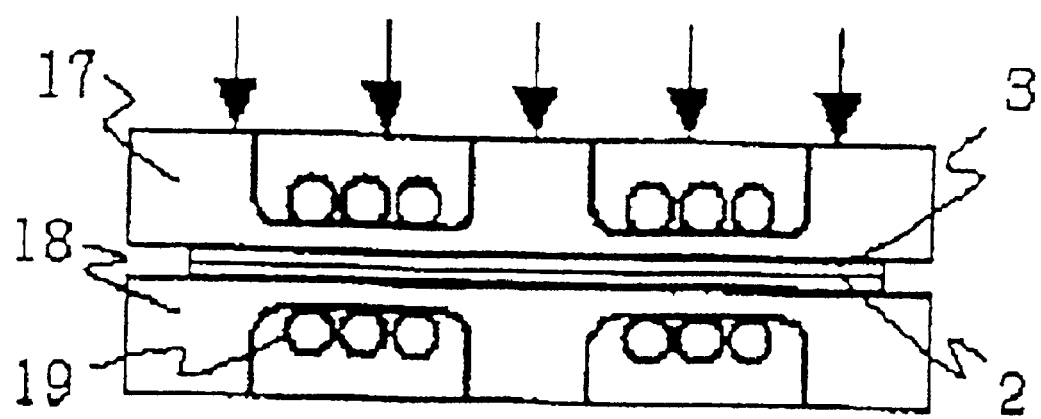

With reference to FIG. 11D, a combined substrate structure 1 comprising the thin film transistor substrate 2 and the color filter substrate 3 is pressed by a combination of a top surface plate 17 and a bottom surface plate 18, each of which includes a heat source 18, thereby carrying out the main thermosetting process of the seal 13. Each of the top and bottom surface plates 17 and 18 have a highly accurate planarity This press mechanism presses the combined substrate structure 1, so that a gap between the thin film transistor substrate 2 and the color filter substrate 3 is set at about 5 micrometers.

Figure 11E:
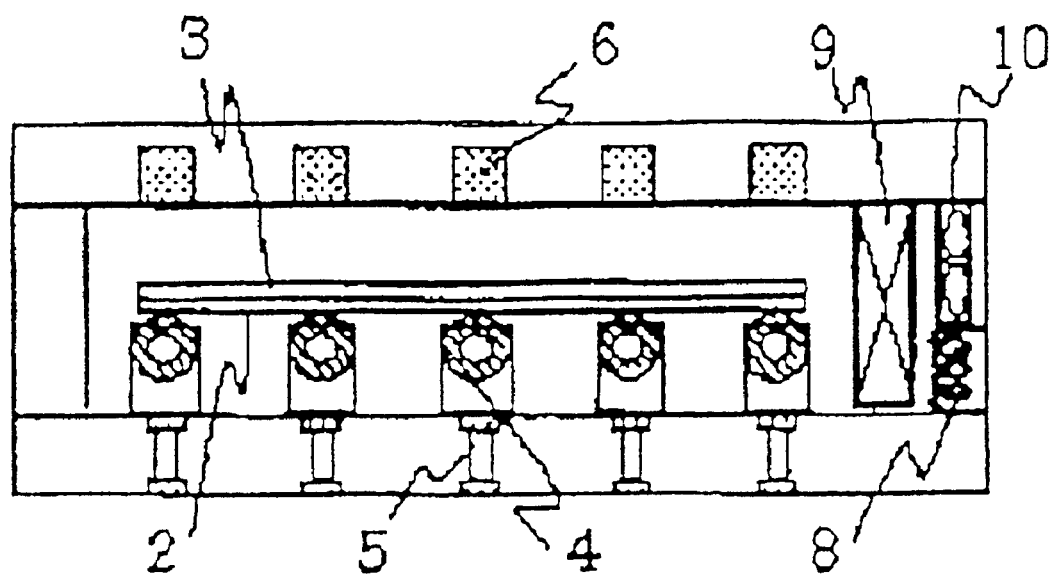

With reference to FIG. 11E, the thermosetting to the seal 13 is continued until the thermosetting is completed by the apparatus shown in FIG. 4, whilst during the thermosetting, the combined substrate structure 1 is subjected to the above-described highly accurate level adjustments of the combined substrate structure 1 by the two-dimensional array of the conveyers 4 with the level adjusters 5, so that the displacement or miss-alignment between the thin film transistor substrate 2 and the color filter substrate 3 is reduced or eliminated. As a result, the desirable combined substrate structure 1 free of any substantive displacement or miss-alignment between the thin film transistor substrate 2 and the color filter substrate 3 is obtained. A liquid crystal is then injected into the small gap between the thin film transistor substrate 2 and the color filter substrate 3.

Another method for forming the combined substrate structure may also be available. FIGS. 12A through 12E are schematic perspective views illustrative of sequential steps involved in a second novel method of combing the thin film transistor substrate and the color filter substrate in accordance with the present invention.

Figure 12A:
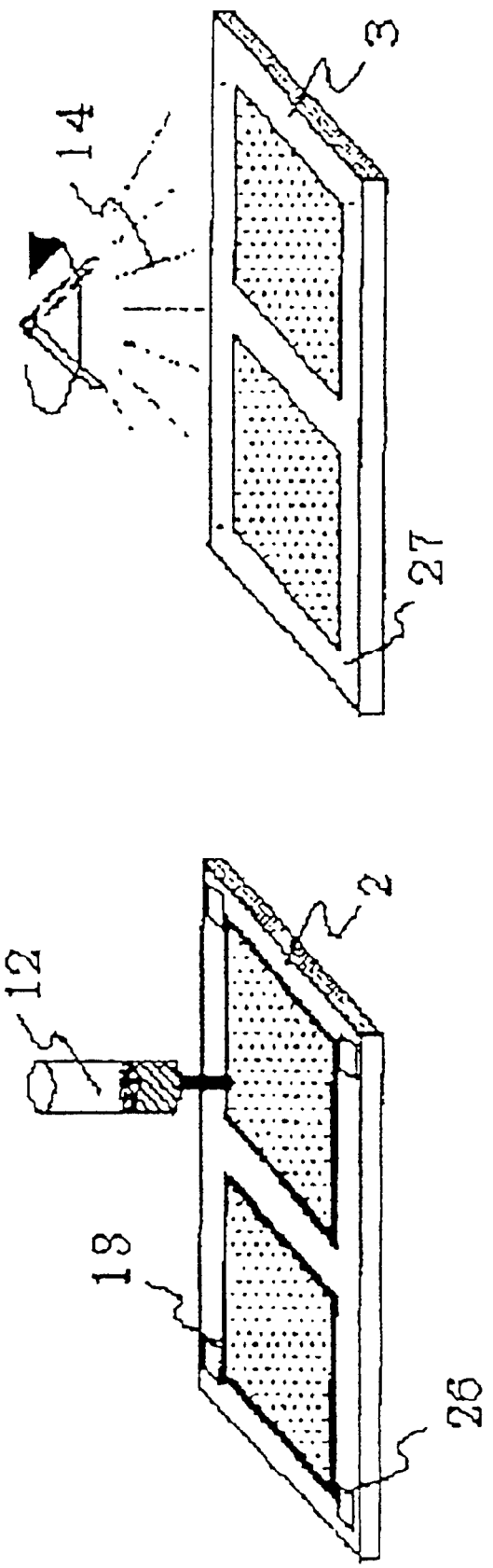

With reference to FIG. 12A, a seal 13 is applied onto a surface of the thin film transistor substrate 2 by an applicator 40. A spacer 14 is dispersed onto a surface of the color filter substrate 3. The seal 13 serves as an adhesive agent. The spacer 14 serves to form a gap between the thin film transistor substrate 2 and the color filter substrate 3. The spacer 14 comprise spherical particles having an averaged diameter of about 5 micrometers.

With reference to FIG. 12B, a liquid crystal 20 is selectively applied by an applicator 20 over the thin film transistor substrate 2.

Figure 12C:
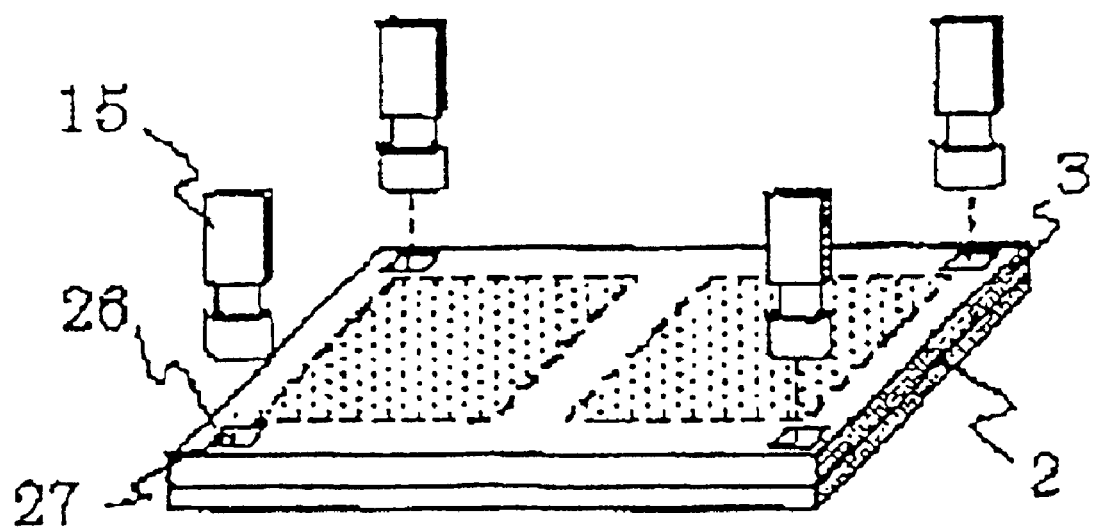

With reference to FIG. 12C, the color filter substrate 3 is placed on the thin film transistor substrate 2, so that a center of each of four alignment marks 26 at four corners of the thin film transistor substrate 2 is aligned to a center of corresponding one of four alignment marks 27 at four corners of the color filter substrate 3. These alignments are confirmed by four cameras 15. The accuracy in the alignment is within ±2 micrometers.

Figure 12D:
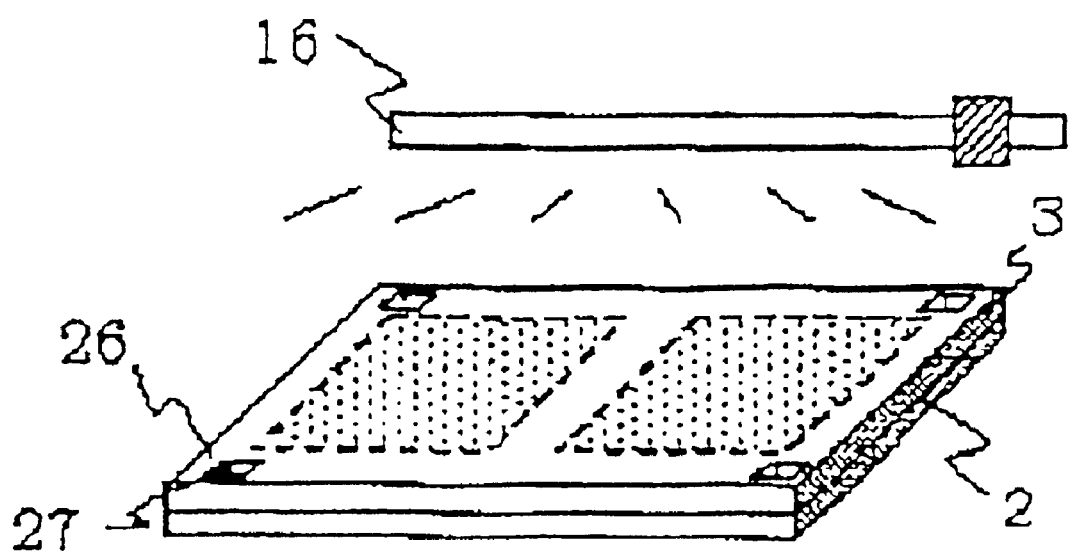

With reference to FIG. 12D, an ultraviolet ray is irradiated from an ultraviolet ray source 16 onto part of entirety of the seal 13 for causing a provisional setting of the seal 13, so as to prevent any dislocation between the thin film transistor substrate 2 and the color filter substrate 3 during a subsequent main thermosetting process.

A combined substrate structure 1 comprising the thin film transistor substrate 2 and the color filter substrate 3 is pressed by a combination of a top surface plate 17 and a bottom surface plate 18, each of which includes a heat source 18, thereby carrying out the main thermosetting process of the seal 13. Each of the top and bottom surface plates 17 and 18 have a highly accurate planarity This press mechanism presses the combined substrate structure 1, so that a gap between the thin film transistor substrate 2 and the color filter substrate 3 is set at about 5 micrometers.

Figure 12E:
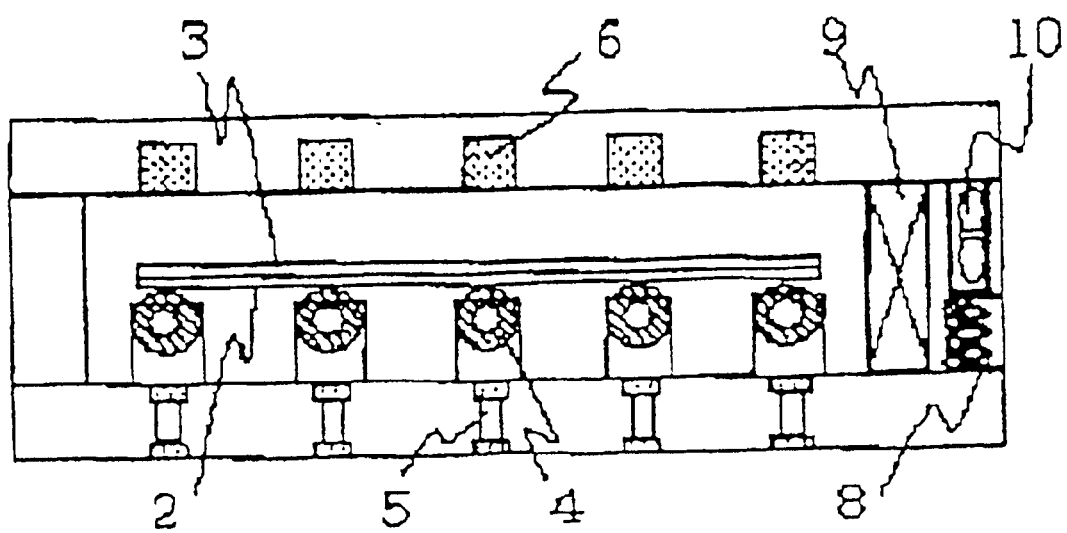

With reference to FIG. 12E, the thermosetting to the seal 13 is continued until the thermosetting is completed by the apparatus shown in FIG. 4, whilst during the thermosetting, the combined substrate structure 1 is subjected to the above-described highly accurate level adjustments of the combined substrate structure 1 by the two-dimensional array of the conveyers 4 with the level adjusters 5, so that the displacement or miss-alignment between the thin film transistor substrate 2 and the color filter substrate 3 is reduced or eliminated. As a result, the desirable combined substrate structure 1 free of any substantive displacement or miss-alignment between the thin film transistor substrate 2 and the color filter substrate 3 is obtained.

Figure 13:
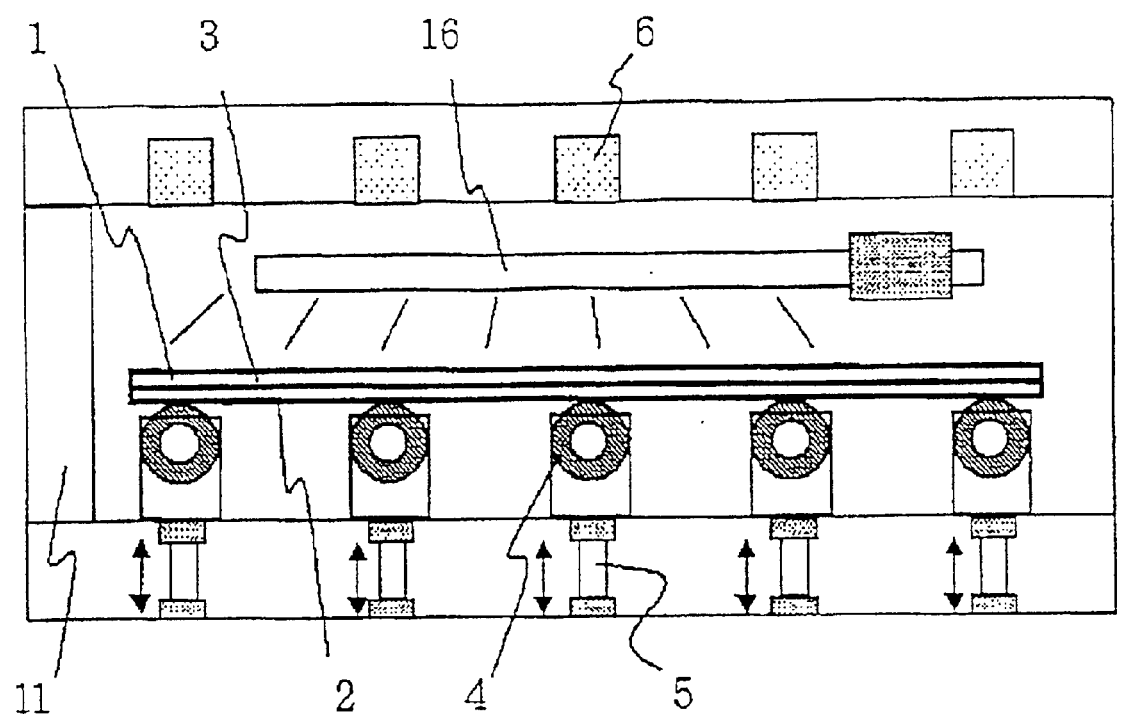
FIG. 13 is a schematic block diagram in a side view of another apparatus for forming a combined substrate structure for a liquid crystal display in a second embodiment in accordance with the present invention.

Second Embodiment:

A second embodiment according to the present invention will be described in detail with reference to the drawings. FIG. 13 is a schematic block diagram in a side view of another apparatus for forming a combined substrate structure for a liquid crystal display in a second embodiment in accordance with the present invention.

In the above-described first embodiment, the apparatus for forming the combined substrate structure 1 takes place the thermosetting to the seal as the adhesive agent between the thin film transistor substrate 2 and the color filter substrate 3.

In this second embodiment, however, the apparatus for forming the combined substrate structure 1 takes place an ultraviolet ray irradiation setting process to the seal between the thin film transistor substrate 2 and the color filter substrate 3 as the provisional setting of the seal 13, so as to prevent any dislocation between the thin film transistor substrate 2 and the color filter substrate 3 during the subsequent main thermosetting process used by the apparatus described in the first embodiment.

The ultraviolet ray irradiation setting process corresponds to the step shown in FIG. 11C or FIG. 12D which has been carried out as the provisional setting process for preventing the dislocation between the thin film transistor substrate 2 and the color filter substrate 3 during the subsequent main thermosetting process used by the apparatus described in the first embodiment.

With reference to FIG. 13, the apparatus includes an entrance 11, and an UV lamp 16. The UV lamp 16 emits an ultraviolet ray which is irradiated onto the combined substrate structure 1 for causing an ultraviolet ray irradiation setting to the seal between the thin film transistor substrate 2 and the color filter substrate 3. During the ultraviolet ray irradiation setting process, the combined substrate structure 1 is supported by the following supporting mechanism.

The supporting mechanism comprises a matrix array of plural pairs of a conveyer 4 and a level adjuster 5. The conveyer 4 is provided on a top of the level adjuster 5 for allowing the level adjuster 5 to adjust the level of the conveyer 4. Namely, each of the conveyers 4 is movable in vertical or elevation direction. The plural level adjusters 5 are operable independently from each other, for independent level adjustments of the plural conveyers 4.

Each of the conveyers 4 further comprises a ring member 4a and a supporting member 4b for supporting the ring member 4a. A top of the ring member 4a is in contact directly with the bottom surface of the combined substrate structure 1.

The apparatus also includes a matrix array of plural level sensors 6 which are positioned over the conveyers 4 for measuring relative levels from a reference level of respective positions of the combined substrate structure 1. Each of the level sensors 6 is further electrically coupled to a controller 12 for sending level-detected signals to the controller 12, wherein the each level detected signal designates the measured level of the measured position of the combined substrate structure 1 from the reference level. The controller 12 analyzes respective level data included in the level detected signals received from the plural level sensors 6 and generate respective control signals based on the analysis of the level data.

Each of the level adjusters 5 is also electrically coupled to the controller for receiving the control signal from the controller, so that the each level adjuster 5 adjusts the level of the paired conveyer 4 for the purpose of always keeping the high planarity of the combined substrate structure 1 and for reducing and/or eliminating the displacement or miss-alignment between the thin film transistor substrate 2 and the color filter substrate 3. The above novel apparatus reduces and/or eliminates the displacement or miss-alignment of the combined substrate structure 1.

The combined substrate structure 1 is carried through the entrance into the oven, wherein the combined substrate structure 1 is supported over the matrix array of the plural conveyers 4. The UV lamp 16 emits an ultraviolet ray which is irradiated onto the combined substrate structure 1 for causing an ultraviolet ray irradiation setting to the seal between the thin film transistor substrate 2 and the color filter substrate 3, wherein the combined substrate structure 1 is kept at the high planarity by the above substrate supporting mechanism. This allows a highly accurate alignment between the thin film transistor substrate 2 and the color filter substrate 3. If the combined substrate structure 1 is used for the liquid crystal display, then a desirable high light-transmittivity and a desirable high display quality can be obtained.

In accordance with the second embodiment, the apparatus may also do the level adjustments of the combined substrate structure 1 so that the combined substrate structure 1 has such a flexure as compensating the displacement or miss-alignment between the thin film transistor substrate 2 and the color filter substrate 3.

Figure 14:
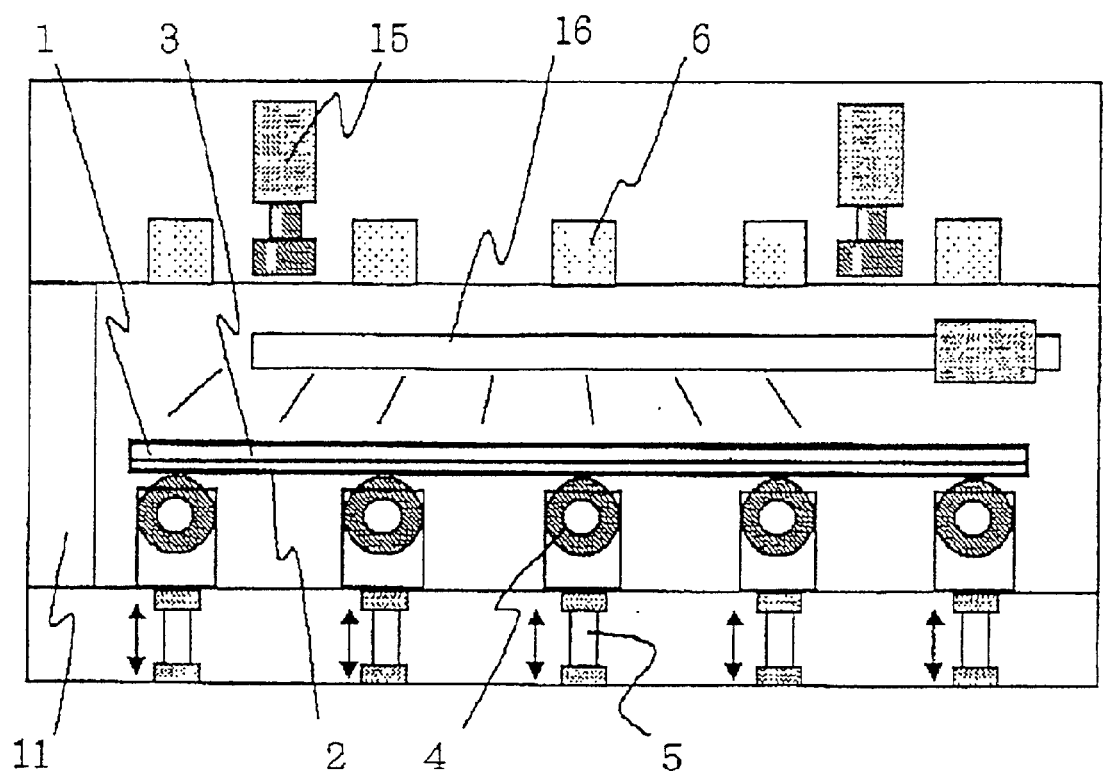
FIG. 14 is a schematic block diagram in a side view of another apparatus for forming a combined substrate structure for a liquid crystal display in a third embodiment in accordance with the present invention.

Third Embodiment:

A third embodiment according to the present invention will be described in detail with reference to the drawings. FIG. 14 is a schematic block diagram in a side view of another apparatus for forming a combined substrate structure for a liquid crystal display in a third embodiment in accordance with the present invention.

The apparatus of this third embodiment has the same structure as the above-described apparatus of the second embodiment, except that the apparatus of this third embodiment further include image monitoring devices 15. The image monitoring devices 15 are positioned over the combined substrate structure 1 for monitoring the alignment marks 26 of the thin film transistor substrate 2 and the alignment marks 27 of the color filter substrate 3 and recognizing the displacement or the miss-alignment between the alignment marks 26 and 27. The image monitoring devices 15 may optionally comprise the controller 12 which is not illustrated in FIG. 14. The image monitoring devices 15 recognize a quantity of the displacement or the miss-alignment between the alignment marks 26 and 27 and generate a signal which designates the quantity of the displacement or the miss-alignment, whereby this signal is then transmitted to the controller 12. The controller 12 generates control signals which are transmitted to the respective level adjusters 5. Each of the level adjusters 5 performs a level adjustment of the conveyer 4 in accordance with the received control signal from the controller 12. During the seal setting process, the above level adjustment process using the image monitoring devices 15 is carried out in addition to the level adjustment process using the level sensors 6. The use of the image monitoring devices 15 may further improve the accuracy in the alignment or reduce the displacement between the thin film transistor substrate 2 and the color filter substrate 3 as compared to the above-described second embodiment.

The use of the image monitoring devices 15 may also allow collections or accumulations of the important data in connection with the quantity of the displacement or the miss-alignment for all of the combined substrate structure 1 in order to grasp the tendency of the amount of the displacement or miss-alignment depending on the various factors such as the kinds of the products, and the materials of the substrates. This allows setting different conditions for the different factors such as the kinds of the products, and the materials of the substrates, whereby the improvement in the accuracy in alignment between the thin film transistor substrate 2 and the color filter substrate 3 can be obtained for various kinds of the products.

Modifications:

As described above, the primary cause of the displacement between the thin film transistor substrate 2 and the color filter substrate 3 is the flexure of the combined substrate structure 1. The secondary cause of the displacement between the thin film transistor substrate 2 and the color filter substrate 3 is the difference in thermal expansion between the thin film transistor substrate 2 and the color filter substrate 3, wherein the difference in thermal expansion includes a difference in thermal capacity between the thin film transistor substrate 2 and the color filter substrate 3, and another difference in thermal expansion coefficient between the thin film transistor substrate 2 and the color filter substrate 3, as well as an additional difference in temperature distribution between the thin film transistor substrate 2 and the color filter substrate 3.

Each of the above described three apparatuses of the first, second and third embodiments is responsible to the secondary cause of the displacement between the thin film transistor substrate 2 and the color filter substrate 3.

Figure 15A:
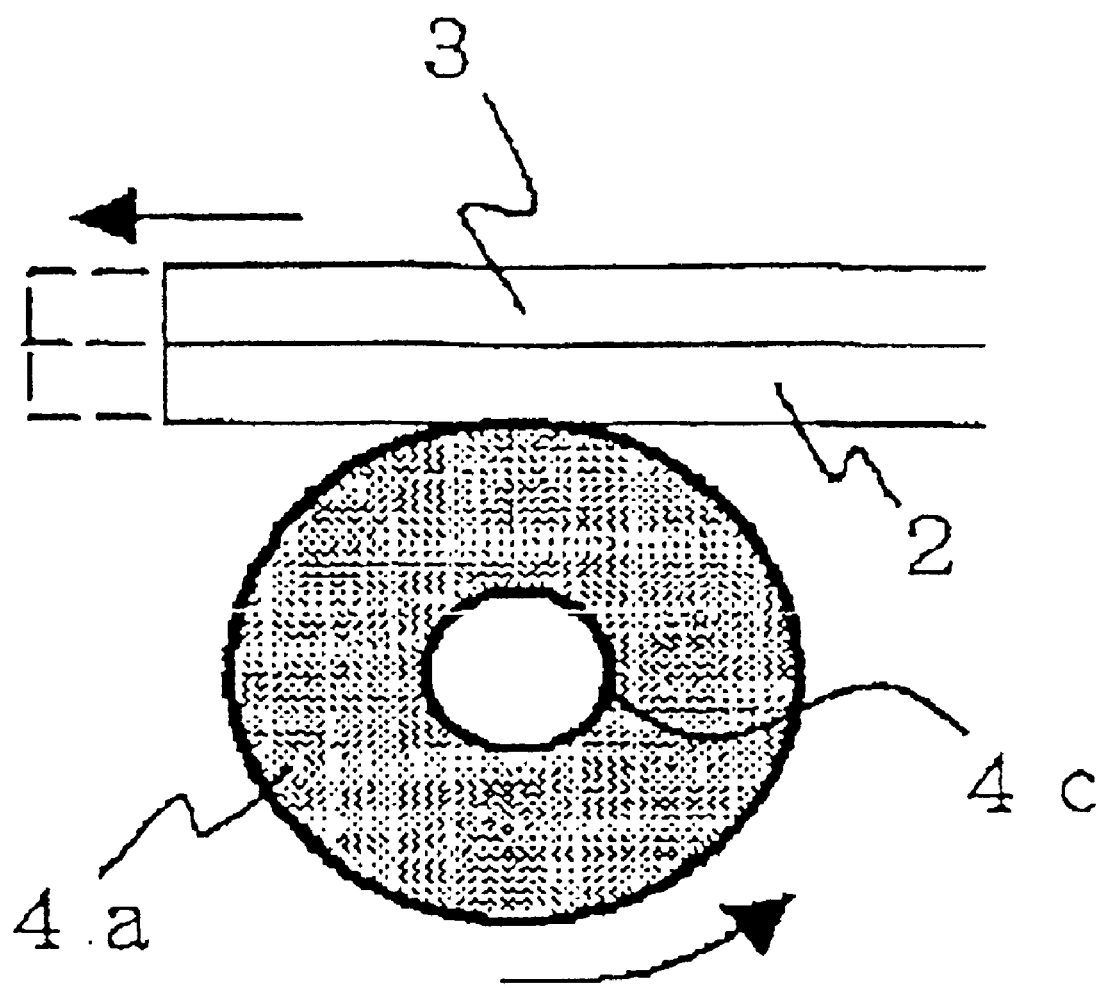
FIG. 15A is a fragmentary side view of a first-modified structure of the top of each conveyer included in the apparatus in each of the first, second and third embodiments.

FIG. 15A is a fragmentary side view of a first-modified structure of the top of each conveyer included in the apparatus in each of the first, second and third embodiments. As described in the foregoing embodiment, each of the conveyers 4 comprises the ring member 4a and the supporting member 4b for supporting the ring member 4a. A top of the ring member 4a is in contact directly with the bottom surface of the combined substrate structure 1.

In the above-described first to third embodiments, the ring member 4a is fixed to the supporting member 4b, so that the ring member 4a does not rotate. It is, however, possible to modify the structure of the conveyer 4, so that the ring member 4a is mechanically coupled to the supporting member 4b for allowing the ring member 4a to rotate around an axis 4c as shown in FIG. 15A.

This structure for allowing the ring member 4a to rotate around an axis 4c does not prevent the thermal expansion of the thin film transistor substrate 2. Namely, the rotation of the ring member 4a around the axis 4c allows the thin film transistor substrate 2 to show a thermal expansion free of any friction between the thin film transistor substrate 2 and the ring member 4a. On the other hand, the color filter substrate 3 is not contact with the conveyer 4, for which reason the color filter substrate 3 shows the thermal expansion free of any friction with the conveyer 4.

Accordingly, both the thin film transistor substrate 2 and the color filter substrate 3 are allowed to show the thermal expansions free from any substantive prevention due to the friction with the ring member 4a of the conveyer 4. There is no substantive difference in the thermal expansion rate between the thin film transistor substrate 2 and the color filter substrate 3. For example, the glass substrate has a linear expansion coefficient of about 4E-6/° C. If the glass substrate having a length of 2P=680 mm is increased in temperature from 25° C. to 200° C., then the length 2P is expanded by 0.48 mm.

Further, the bottom surface of the thin film transistor substrate 2 has a small contact area with the ring members 4a of the conveyers 4. The contact with the small contact area causes a small heat conduction from the thin film transistor substrate 2 through the small contact area to the ring members 4a. This causes a relatively uniform temperature distribution of the combined substrate structure 1. This relatively uniform temperature distribution causes a relatively uniform thermal expansion over the combined substrate structure 1. This relatively uniform thermal expansion over the combined substrate structure 1 reduces the displacement between the thin film transistor substrate 2 and the color filter substrate 3.

Since the conveyers 4 have a small contact area with the combined substrate structure 1, this allows that a robot hand is placed under the bottom surface of the combined substrate structure 1. If the robot hand rifts up the combined substrate structure 1 and the bottom surface of the combined substrate structure 1 becomes separated from the conveyers 4, then the combined substrate structure 1 is electrically charged depending on the contact area between the conveyers 4 and the combined substrate structure 1. The small contact area between the conveyers 4 and the combined substrate structure 1 causes a small charge to the combined substrate structure 1 upon separation of the combined substrate structure 1 from the conveyers 4. The small charge may avoid any formation of short circuit between layers or the electrostatic breaking of the device.

Figure 15B:
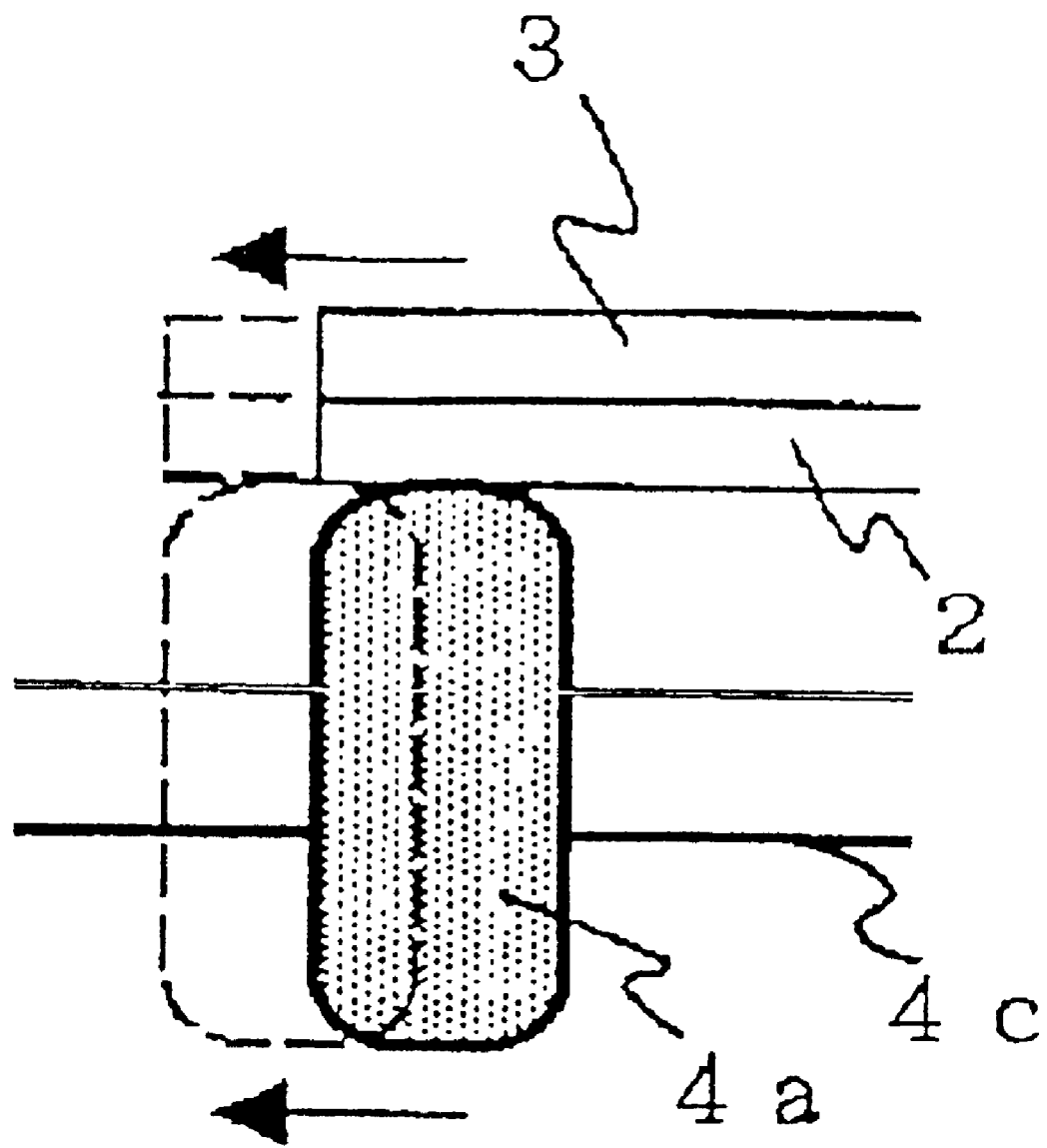
FIG. 15B is a fragmentary side view of a second-modified structure of the top of each conveyer included in the apparatus in each of the first, second and third embodiments.

FIG. 15B is a fragmentary side view of a second-modified structure of the top of each conveyer included in the apparatus in each of the first, second and third embodiments. The ring member 4a is mechanically coupled to the supporting member 4b for allowing the ring member 4a to slide along the axis 4c as shown in FIG. 15B.

This structure for allowing the ring member 4a to slide along the axis 4c does not prevent the thermal expansion of the thin film transistor substrate 2. Namely, the sliding of the ring member 4a along the axis 4c allows the thin film transistor substrate 2 to show a thermal expansion free of any friction between the thin film transistor substrate 2 and the ring member 4a. On the other hand, the color filter substrate 3 is not contact with the conveyer 4, for which reason the color filter substrate 3 shows the thermal expansion free of any friction with the conveyer 4.

Accordingly, both the thin film transistor substrate 2 and the color filter substrate 3 are allowed to show the thermal expansions free from any substantive prevention due to the friction with the ring member 4a of the conveyer 4. There is no substantive difference in the thermal expansion rate between the thin film transistor substrate 2 and the color filter substrate 3. For example, the glass substrate has a linear expansion coefficient of about 4E-6/° C. If the glass substrate having a length of 2P=680 mm is increased in temperature from 25° C. to 200° C., then the length 2P is expanded by 0.48 mm.

Further, the bottom surface of the thin film transistor substrate 2 has a small contact area with the ring members 4a of the conveyers 4. The contact with the small contact area causes a small heat conduction from the thin film transistor substrate 2 through the small contact area to the ring members 4a. This causes a relatively uniform temperature distribution of the combined substrate structure 1. This relatively uniform temperature distribution causes a relatively uniform thermal expansion over the combined substrate structure 1. This relatively uniform thermal expansion over the combined substrate structure 1 reduces the displacement between the thin film transistor substrate 2 and the color filter substrate 3.

Since the conveyers 4 have a small contact area with the combined substrate structure 1, this allows that a robot hand is placed under the bottom surface of the combined substrate structure 1. If the robot hand rifts up the combined substrate structure 1 and the bottom surface of the combined substrate structure 1 becomes separated from the conveyers 4, then the combined substrate structure 1 is electrically charged depending on the contact area between the conveyers 4 and the combined substrate structure 1. The small contact area between the conveyers 4 and the combined substrate structure 1 causes a small charge to the combined substrate structure 1 upon separation of the combined substrate structure 1 from the conveyers 4. The small charge may avoid any formation of short circuit between layers or the electrostatic breaking of the device.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An apparatus for supporting a combined substrate structure which comprises first and second substrates combined, said apparatus including:
    a plurality of level-adjustable supporting mechanism for supporting plural supporting points of a bottom surface of said combined substrate structure, said level-adjustable supporting mechanism being capable of adjusting a level thereof;
    a level-detecting system for detecting respective levels of corresponding points of a top surface of said combined substrate structure to said plural supporting points of said bottom surface; and
    a control system for receiving said detected levels from said level-detecting system and for controlling said plurality of level-adjustable supporting mechanism in respective level-adjustment operations in accordance with said detected levels.

2. The apparatus as claimed in claim 1, wherein said control system controls said plurality of level-adjustable supporting mechanism in respective level-adjustment operations so as to suppress a flexure of said combined substrate structure within a maximum acceptable flexure value which corresponds to a maximum value of an acceptable range of a displacement between said first and second substrates.

3. The apparatus as claimed in claim 2, wherein said plurality of level-adjustable supporting mechanism are arranged in a two-dimensional array under said bottom surface of said combined substrate structure.

4. The apparatus as claimed in claim 3, wherein said control system controls said plurality of level-adjustable supporting mechanism in respective level-adjustment operations so as to suppress respective flexures of divided sub-regions of said combined substrate structure within said maximum acceptable flexure value.

5. The apparatus as claimed in claim 3, wherein said level-detecting system includes a two-dimensional array of level-detecting sensors which are positioned over said plurality of level-adjustable supporting mechanism.

6. The apparatus as claimed in claim 1, wherein said control system controls said plurality of level-adjustable supporting mechanism in respective level-adjustment operations so as to cause said combined substrate structure to have an inverse flexure to a virtual flexure which is substantially equivalent to a displacement between said first and second substrates, where said inverse flexure is equal in absolute value to and opposite in polarity to said virtual flexure.

7. The apparatus as claimed in claim 6, wherein said inverse flexure is controlled within a predetermined upper-limit value.

8. The apparatus as claimed in claim 1, further including:
   a displacement-detecting system for detecting a displacement between said first and second substrates and for sending a displacement signal which indicates a quantity of said detected displacement to said control system; and
   said control system receiving said displacement signal from said displacement-detecting system and controlling said plurality of level-adjustable supporting mechanism in respective level-adjustment operations in accordance with said displacement signal.

9. The apparatus as claimed in claim 8, wherein said displacement-detecting system comprises a plurality of image recognition devices for recognizing a displacement between a first alignment mark of said first substrate and a second alignment mark of said second substrate, said first and second alignment marks making a pair.

10. The apparatus as claimed in claim 9, wherein said plurality of image recognition devices comprise cameras.

11. The apparatus as claimed in claim 1, wherein said level-adjustable supporting mechanism comprises a conveyer for mechanically supporting said combined substrate structure; and a level-adjuster for adjusting a level of said conveyer in accordance with said control signal from said control system.

12. The apparatus as claimed in claim 11, wherein said level-adjuster comprises an actuator showing elevations with a controlled stroke in accordance with said control signal from said control system.

13. The apparatus as claimed in claim 11, wherein said conveyer is mechanically coupled to said level adjuster so as to move following to any thermal expansion of bottom one of said first and second substrates.

14. The apparatus as claimed in claim 13, wherein said conveyer rotates following to any thermal expansion of bottom one of said first and second substrates.

15. The apparatus as claimed in claim 13, wherein said conveyer slides following to any thermal expansion of bottom one of said first and second substrates.

16. The apparatus as claimed in claim 1, further including:
   a heating system for heating said combined substrate structure to cause thermosetting an adhesive sealing layer between said first and second substrate.

17. The apparatus as claimed in claim 1, further including:
   an ultraviolet ray irradiating system for irradiating an ultraviolet ray onto said combined substrate structure to cause UV-setting an adhesive sealing layer between said first and second substrate.

18. An apparatus for supporting a combined substrate structure which comprises first and second substrates combined, said apparatus including:
   a two-dimensional array of level-adjustable supporting mechanisms for supporting plural supporting points of a bottom surface of said combined substrate structure, each of said level-adjustable supporting mechanisms further comprising a conveyer for mechanically supporting said combined substrate structure; and a level-adjuster for adjusting a level of said conveyer;
   a two-dimensional array of level-detecting sensors positioned over said level-adjustable supporting mechanisms for detecting respective levels of corresponding points of a top surface of said combined substrate structure to said plural supporting points of said bottom surface; and
   a control system for receiving said detected levels from said level-detecting system and for controlling said level-adjusters in respective level-adjustment operations in accordance with said detected levels.

19. The apparatus as claimed in claim 18, wherein said control system controls said level-adjusters in respective level-adjustment operations so as to suppress a flexure of said combined substrate structure within a maximum acceptable flexure value which corresponds to a maximum value of an acceptable range of a displacement between said first and second substrates.

20. The apparatus as claimed in claim 18, wherein said control system controls said level-adjusters in respective level-adjustment operations so as to suppress respective flexures of divided sub-regions of said combined substrate structure within said maximum acceptable flexure value.

21. The apparatus as claimed in claim 18, wherein said control system controls said level-adjusters in respective level-adjustment operations so as to cause said combined substrate structure to have an inverse flexure to a virtual flexure which is substantially equivalent to a displacement between said first and second substrates, where said inverse flexure is equal in absolute value to and opposite in polarity to said virtual flexure.

22. The apparatus as claimed in claim 21, wherein said inverse flexure is controlled within a predetermined upper-limit value.

23. The apparatus as claimed in claim 18, further including:
   a displacement-detecting system for detecting a displacement between said first and second substrates and for sending a displacement signal which indicates a quantity of said detected displacement to said control system; and
   said control system receiving said displacement signal from said displacement-detecting system and controlling said level-adjusters in respective level-adjustment operations in accordance with said displacement signal.

24. The apparatus as claimed in claim 23, wherein said displacement-detecting system comprises a plurality of image recognition devices for recognizing a displacement between a first alignment mark of said first substrate and a second alignment mark of said second substrate, said first and second alignment marks making a pair.

25. The apparatus as claimed in claim 24, wherein said plurality of image recognition devices comprise cameras.

26. The apparatus as claimed in claim 18, wherein each of said level-adjuster comprises an actuator showing elevations with a controlled stroke in accordance with said control signal from said control system.

27. The apparatus as claimed in claim 18, wherein said conveyer is mechanically coupled to said level adjuster so as to move following to any thermal expansion of bottom one of said first and second substrates.

28. The apparatus as claimed in claim 27, wherein said conveyer rotates following to any thermal expansion of bottom one of said first and second substrates.

29. The apparatus as claimed in claim 27, wherein said conveyer slides following to any thermal expansion of bottom one of said first and second substrates.

30. The apparatus as claimed in claim 18, further including:
a heating system for heating said combined substrate structure to cause thermosetting an adhesive sealing layer between said first and second substrate.

31. The apparatus as claimed in claim 18, further including:
an ultraviolet ray irradiating system for irradiating an ultraviolet ray onto said combined substrate structure to cause UV-setting an adhesive sealing layer between said first and second substrate.

32. A method of supporting a combined substrate structure which comprises first and second substrates, and said combined substrate structure being supported at plural supporting points on a bottom surface thereof by a plurality of level-adjustable supporting mechanisms, said method including:
detecting respective levels of corresponding points of a top surface of said combined substrate structure to said plural supporting points of said bottom surface; and
controlling said level-adjustable supporting mechanisms in respective level-adjustment operations in accordance with said detected levels.

33. The method as claimed in claim 32, wherein said respective level-adjustment operations are made so as to suppress a flexure of said combined substrate structure within a maximum acceptable flexure value which corresponds to a maximum value of an acceptable range of a displacement between said first and second substrates.

34. The method as claimed in claim 32, wherein said respective level-adjustment operations are made so as to suppress respective flexures of divided sub-regions of said combined substrate structure within said maximum acceptable flexure value.

35. The method as claimed in claim 32, wherein said respective level-adjustment operations are made so as to cause said combined substrate structure to have an inverse flexure to a virtual flexure which is substantially equivalent to a displacement between said first and second substrates, where said inverse flexure is equal in absolute value to and opposite in polarity to said virtual flexure.

36. The method as claimed in claim 35, wherein said inverse flexure is controlled within a predetermined upper-limit value.

37. The method as claimed in claim 32, further including:
detecting a displacement between said first and second substrates; and
controlling said respective level-adjustment operations in accordance with said detected displacement.

38. The method as claimed in claim 37, wherein said step of detecting said displacement comprises recognizing a displacement between a first alignment mark of said first substrate and a second alignment mark of said second substrate, said first and second alignment marks making a pair.

\* \* \* \* \*